United States Patent [19]

Putman

[11] Patent Number: 4,628,462

[45] Date of Patent: Dec. 9, 1986

[54] MULTIPLANE OPTIMIZATION METHOD AND APPARATUS FOR COGENERATION OF STEAM AND POWER

[75] Inventor: Richard E. Putman, Penn Hills, Pa.

[73] Assignee: Westinghouse Electric Corp., Pittsburgh, Pa.

[21] Appl. No.: 649,462

[22] Filed: Sep. 11, 1984

[51] Int. Cl.⁴ ............................................. G06F 15/46
[52] U.S. Cl. .................................. 364/494; 364/464; 60/660
[58] Field of Search ................. 364/14, 464, 492, 493, 364/494, 174, 176; 60/648, 660, 662; 290/40 R, 40 A, 40 C; 415/15, 17

[56] References Cited

U.S. PATENT DOCUMENTS

| | | | |
|---|---|---|---|
| 3,872,286 | 3/1975 | Putman | 364/464 |
| 4,088,875 | 5/1978 | Podolsky et al. | 364/494 |
| 4,110,825 | 8/1978 | Fox et al. | 364/492 |
| 4,214,451 | 7/1980 | Coombes et al. | 60/662 |
| 4,234,925 | 11/1980 | Kitano et al. | 364/494 |
| 4,258,424 | 3/1981 | Giras et al. | 60/660 |
| 4,297,848 | 11/1981 | Silvestri, Jr. | 60/660 |

Primary Examiner—Parshotam S. Lall
Attorney, Agent, or Firm—C. M. Lorin

[57] ABSTRACT

In a steam and power cogeneration system optimization results for steam flow and power are calculated off-line recurrently based on actual demand and control is effected on a multiplane basis upon selection of a new plane of control defined by a new status and configuration of the system network, the optimization results for such particular plane being selected and control performed at the time of plane change. Pressure reducing valves are positioned initially at the time of plane change in accordance with the optimization results for the new plane. Pressure reducing valves are positioned for flow tuning about such initial valve positioning.

7 Claims, 13 Drawing Figures

MULTIPLANE OPTIMIZATION METHOD AND APPARATUS FOR COGENERATION OF STEAM AND POWER

CROSS-REFERENCE TO RELATED APPLICATIONS

The present application is related to two copending patent applications Ser. No. 550,164 filed Nov. 8, 1983 and Ser. No. 548,478 filed Nov. 3, 1983, U.S. Pat. No. 4,577,280 which are assigned to the same assignee as the present application, entitled "Steam Optimization And Cogeneration System And Method", and "Pressure Control Apparatus And Method For Multiturbogenerator System", respectively, the disclosures of which are hereby incorporated by reference.

BACKGROUND OF THE INVENTION

The present invention relates to process control in general, and more particularly, to a computer technique for the optimization of process control through the use of a matrix.

Optimization techniques are known to maximize the production and/or to minimize the cost of operating an industrial process, especially with regard to the consumption of energy and the correlating production output. These techniques are particularly applicable in chemical engineering, and they have been used there for establishing operating conditions that yield a maximum return on investment while minimizing operating costs.

The prior art reveals mathematical optimization techniques, such as linear programming and evolutionary operation techniques. The latter has been disclosed in *Chemical Engineering* of July 5, 1965 "Process Improvement with SIMPLEX Self-Directing Evolutionary Operation" by B. H. Carpenter and H. C. Sweeney, pp. 117–126. The evolutionary, or EVOP, method of optimization has been applied ideally to a steam-power cogeneration process, as disclosed in patent application Ser. No. 550,164 filed Nov. 8, 1983, now U.S. Pat. No. 4,604,714 by treating cogenerated electrical power in terms of steam flow and using steam flow and power balances in the process to make a model readily applicable for successive tests leading to an optimal solution.

Another optimization technique is the linear programming approach which uses a matrix reflecting the key variables and parameters in the cogeneration process, also in terms of steam flow. In contrast to the EVOP model the linear programming matrix, however, is able to take into account more process variables, more parameters and still reflect the various possible status of the equipment such as MANUAL/AUTO ON/OFF, and handle many constraints.

The linear programming method is known in the prior art (see for instance: (1) Dantzing, G. B., "Linear Programming and Extensions", published by Princeton University Press, 1963; (2) Hadley, G., "Linear Programming", published by AddisonWesley Publishing Co., 1962; (3) Llewellyn, R. W., "Linear Programming", published by Holt, Rinehart and Winston, 1964; (4) McMillan, Claude, "Mathematical Programming", published by John Wiley and Sons, Inc., 1970.) Because of its very complexity linear programming has been thought to be impractical where optimization should lead to a prompt implementation of the solution. It is the reason why, in the past, the well known linear programming technique would never have been used in a cogeneration steam-power plant project. By the time the optimization system would seem to converge on the desired solution, the initial conditions taken into consideration by the calculations performed with the matrix would have or could have, changed so much that the mathematical solution would have lost any physical meaning and could not be implemented by control of the plant. The particular mass flow treatment exercised for linear programming, as well as in accordance with the EVOP approach disclosed in patent application Ser. No. 550,164 filed 11/8/83, now U.S. Pat. No. 4,604,714 makes it practical to use the linear programming approach for optimization in a cogeneration steam-power plant.

A linear programming matrix based upon base flow treatment of the steam and power as exemplified in the description hereinafter of the preferred embodiment, shown that the matrix can not only be reduced to a size which is easy to handle, and without ceasing to reflect the complexity introduced by noting equipment status and adding pressure and temperature to depict true mass flow, but by also leading to a matrix exhibiting so many zero coefficients, that the program code is able to jump around the zero elements in the matrix and converge to a solution within a time so short as to allow a direct implementation by control of the found solution. This is a favorable circumstance since it is desirable to be able to quickly estalish what the optimum result is, as soon as a number of initial conditions in the process have been ascertained. There may be a new steam demand, or a new power demand, in the plant, or an exercise of demand control in regard to the demand limit assigned to the tie-line.

In accordance with the present invention, optimization (for instance by the EVOP approach or the linear programming technique) is used for maximizing the utilization of steam and the generation of power in a plane of control, for instance where the steam is derived from a main stream of steam by a steam-power generating and processing installation, through at least a first and often a second steam-to-electrical power converter. The main stream of steam is distributed into first and second independently regulated steam flow inputs to the first and second converters, respectively. The first and second steam converters have independently regulated respective first and second steam flow outputs. The first and second converters have respective first and second steam-electrical power response characteristics for providing electrical power in a cogeneration mode in relation to the first and second steam flow inputs and outputs. Means are provided for controlling steam flows in the first and second inputs and outputs to generate electrical power and deliver steam at the first and second flow outputs in accordance with a predetermined power demand and steam demand of the installation. A tie-line network is provided for supplying complementary electrical power for said power demand at a cost different from the power derived from steam by cogeneration. Several global equipment status and network configurations of the system are anticipated, which define a number of predetermined and discontinuous planes. Such a plane for instance may correspond to all steam turbines being operative. Another plane would be when a particular turbine has been tripped. For each anticipated plane, whether present or not, the optimization process is conducted, off-line with a model involving balanced mass flow between the first and second steam flow inputs and outputs on the basis of an initial setting. As a result of such optimization, results are obtained which suppose that the first and second steam flow inputs and outputs will be given a particular setting in accordance with the values generated by the off-line optimization of the model. These results of the optimization are stored, from time to time refreshed to match intervening fluctuations in the demand of steam and power. Then, settings are implemented for the particular plane as soon as it becomes active, i.e. becomes the new present plane.

The off-line optimization typically is performed, with an EVOP model or by linear programming, with a matrix arranged on the basis of balanced inputs and outputs of steam and power only, thus, without the assist of enthalpy or entropy characteristics in determining the power derived by cogeneration.

Constraints are exercised, ON and OFF status of the equipment are recognized and consideration is given whether inputs and/or outputs are reaching inferior or upper limits during the optimization process, such limits being accepted as a constraint in the model response evaluation.

Taking advantage of such optimization approach for cogeneration of steam and power for several planes in advance, the invention makes use of the optimization approach off-line in a multiplane system, each plane involving mass flow of fluid, and corresponding to a different structural arrangement of flow paths, turbine valves, boilers, steam demand inputs and steam demand outputs, whereby different settings can be immediately established in the new plane and a quick use of another optimization process therein is possible.

Thus the object of the present invention is to make it possible to estimate the optimum assignment of steam flows and power throughout the system for any particular cogeneration system defined in a new plane for establishing an optimum distribution of the available steam matching the process steam demand and the power demand at the respective pressures therein.

The invention provides speedy and intelligent reaction to the various contingencies when leaving a control plane and reaching a new control plane by (1) providing a rapid and safe mode of switching between planes and (2) providing ahead of valve control at the junction between planes pre-planned responses to each of an anticipated set of contingencies with respect to switching to a new control plane. On the latter point, it is observed, incidentally, that a steam valve can be used normally as a pressure reducing valve and occasionally as a let-down valve, so as to hold the pressure in the inlet header to a safe value. The latter alternative is provided for safety considerations, since the valve inlet pressure would take precedence over the outlet pressure loop commands of the valve. The conventional approach in this respect has been, under an analog method, to provide two separate controllers, the higher of the two outputs thereof being selected to prevail. The two output signals would, in an alternative solution, be applied to a summer, so that the high-pressure controller would become predominant, as soon as its output signal has prevailed over the signal of the other controller. However, the switching operation, e.g. before either currently active controller assumes full control over the other, raises a question of timing. A sizable time inherent to the controllers will lapse, which is due to the time taken for the associated integrators to decay. Besides, in the intervening time interval, the controllers on either sides tend to react back and forth. Control plane switching according to the present invention eliminates such delays and interactions. The invention provides for a velocity algorithm to be used for feedback control, thereby allowing the position register for each valve to be adjusted from an external source, while assuming pre-calculated values, which are down-loaded to the registers as soon as such disturbances are occurring. Subsequently, in accordance with the technique of application Ser. No. 548,478 filed Nov. 3, 1983, now U.S. Pat. No. 4,577,280 normal execution of the (PID) controller algorithms will provide values for adjustment of the valve position, in order to bring any residual header pressure error within tolerances.

The first point mentioned above has to do with the initial phase leading to implementation within the selected new plane for optimization within a multiplane fluid and power distribution system.

Such contingency, for instance, involves in a steam cogeneration plant, the calculation ahead of time of the settings of valve position to which the plant should be moved in the event of one or more turbo-generators tripping off-line. It could also be the tie-line circuit breaker falling open.

SUMMARY OF THE INVENTION

The invention resides in multiplane fluid and power optimal distribution in a system susceptible of predetermined different equipment status and network configurations. In each plane control of the mass flow distribution and the cogeneration of power is performed in accordance with a preferred optimization technique.

In accordance with the invention concurrently with such fluid and power distribution optimization effected in a new plane, provision is made for an immediate adjustment of the pressure so as to reach the steady state substantially immediately. The invention, thus, provides for the anticipation of contingencies due to a disturbance resulting from switching to the new plane.

The optimization techniques used in a plane are any known optimization technique. It is, however, proposed according to the invention, to use either the EVOP method disclosed in copending patent application Ser. No. 550,164 filed Nov. 8, 1983, now U.S. Pat. No. 4,604,714, or the linear programming method.

DESCRIPTION OF THE PREFERRED EMBODIMENT

Figure 1:
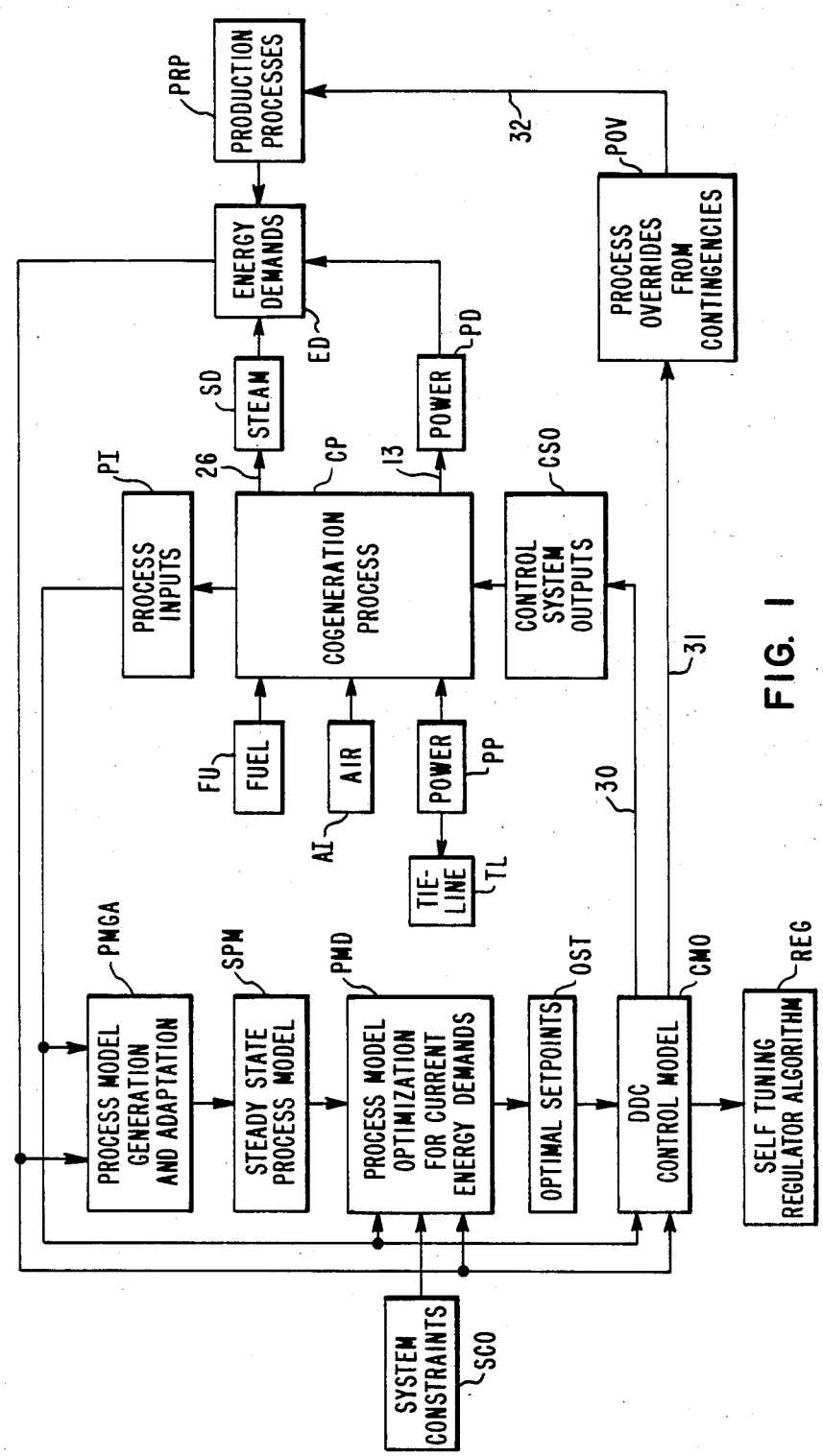
FIG. 1 is a block diagram of a cogeneration process used to generate steam and electrical power to an industrial process.

By plane of control is hereinafter understood a predetermined combination of steam and electrical power converters, of lines of flow concurring in a balanced mass flow of steam concurring with said converters in the generation of a demand of power, in the consumption of steam and in the generation of steam at different levels of enthalpy, in accordance with a given demand of power and a given demand of steam. Depending upon how many of said converters are in operation, depending upon how many lines are being used to accommodate the required flows of steam at predetermined levels of pressure, a different plane of control is defined.

In a plane of control, there may be a requirement for various flows of fluid at the given levels of pressure, and such flows may include fresh steam at a high level of pressure and temperature, and/or low levels of pressure, for instance for steam extracted from a steam turbine, and condenser flow as well. Pressure reducing valves are provided between several lines of flow, on one side at a higher pressure and on the other side at a lower pressure, which are controlled in order to establish a steady state in the plane and to bypass steam from one branch of flow to another. Such pressure reducing valves may require in an emergency rapid adjustments in order to absorb any increase or decrease of pressure in the associated lines and to restore a steady state in the pressure reducing function which insures the constant pressure relation between the various adjoining lines to satisfy the present demand of power and steam. Such emergency situation may result from the new settings engendered by a change in the control plane of the overall steam-power demand system. The new plane, for instance, may result from tripping of a steam-to-electrical power converter. In such case, the consumption of steam to generate power by the converter which has tripped is no longer needed. Also, extraction of steam from such converter as a source of steam to satisfy the demand no longer exists. In such case, steam will be diverted from the lines at the input, through pressure reducing valves, to maintain flow requirements and satisfy the demand. There may also be an increased consumption of steam by the converters which are remaining operative, to generate more power and increase the extraction therefrom. There is, more generally, a number of decisions to be taken in such "new plane" of control. Such successive planes of control of flow may be called "discontinuous" planes, as opposed to the adjustments required from the pressure-reducing valves which define "continuous" planes of pressure control. In the latter instance, the changes of flow due to optimization in the new "discontinuous" plane may cause pressure disturbances in the "continuous" plane around a pressure reducing valve. This can take the form of an increase of pressure ahead of the pressure reducing valve, or a decrease of pressure below the pressure reducing valve. As a result, there is a need for a change in the valve position to accommodate such anomalous increase, or decrease (a "let-down" operation in the first instance, e.g. control by reference to the required normal pressure ahead; a "pressure-reducing" operation in the second instance, e.g. control of the valve position is by reference to the required normal pressure below). Referring first to the "discontinuous" plane changes due to a change of status in the equipment involved in the overall fluid distribution and power generation system, upon the occurrence of such status change the optimization control associated with the system, as appraised of this fact by monitoring and optimization control, is effected in the new plane in accordance with the new status of the equipment. This will be the case, thus in a cogeneration plant, when a steam turbine has tripped, or has returned to operation with the other turbines generating power and providing extraction as well as condenser flow. Before a steady situation has been reached, precalculations take place leading to new valve position settings in the system, in accordance with the new matrix and associated constraints. Taking advantage of the linear nature of the equations, linear programming can be used to achieve optimization. Referring to the "continuous" plane changes, these occur about pressure reducing valves when an emergency situation occurs such as a back-up of pressure ahead of a valve, or a sinking of pressure downward thereof. In this situation, the pressure reducing valves are modulated in position by a predetermined amount so that they absorb the excess or the want of pressure rapidly, thus, as a let-down operation, or as a pressure reducing operation. After the emergency has been quickly handled, fine tuning can take place in order to maintain the flow and pressure distribution required in the steady state, namely as prescribed by the optimization results and consequential control in the discontinuous plane. The normal modulating control operations required on the pressure reducing valves in the continuous plane involve a set of differential equations.

Referring to FIG. 1, a cogeneration process optimization and control scheme is shown in block diagram illustrating the preferred application of the invention. Production processes PRP require energy demand ED in the form of power PD and steam SD. Power and steam are derived via lines 13 and 26, respectively, from an electrical power and steam cogeneration process CP. Process CP is supplied with fuel (FU) and air (AI) and also with a complement of power (PP) purchased from the tie-line network TL.

A process model computerized system PMD seeks and locates the optimization conditions for the current energy demands along lines 13 and 26 from the cogeneration process. To this effect, system PMD responds: to signals representing the constraints (established by circuit SCO) assigned to the system (power capacity; maximum steam; pressure limits; boiler capacity; throttle flow and valve setting inlet and outlet flow limits; condenser minimum); to signals representing the process model inputs (derived from circuit PI) characterizing the cogeneration process (CP), and the level of energy demand (prescribed by circuit ED) i.e. the total steam and power demand which is required. The process model optimization system PMD establishes optimal set points defined by circuit OST. A DDC control model CMO, optionally updated in accordance with a self-tuning regulator algorithm REG, responds to the set points derived from the optimal set point circuit OST, to the process inputs derived from circuit PI and to the energy demand from circuit ED. The control model unit CMO controls the operation of the cogeneration process CP by causing a control system output circuit CSO to generate command signals, and also controls a circuit POV providing for process overrides in case of contingencies. Moreover, a steady state model SPM is provided, associated with a process model generation and adaptation controller PMGA implementing the optimization method according to the present invention, and reflecting the auto/manual status of the units, taking into account whether a unit is ON or OFF-line, acknowledging changing throttle flow coefficients as pressure and/or temperature changes occur.

Figure 2:
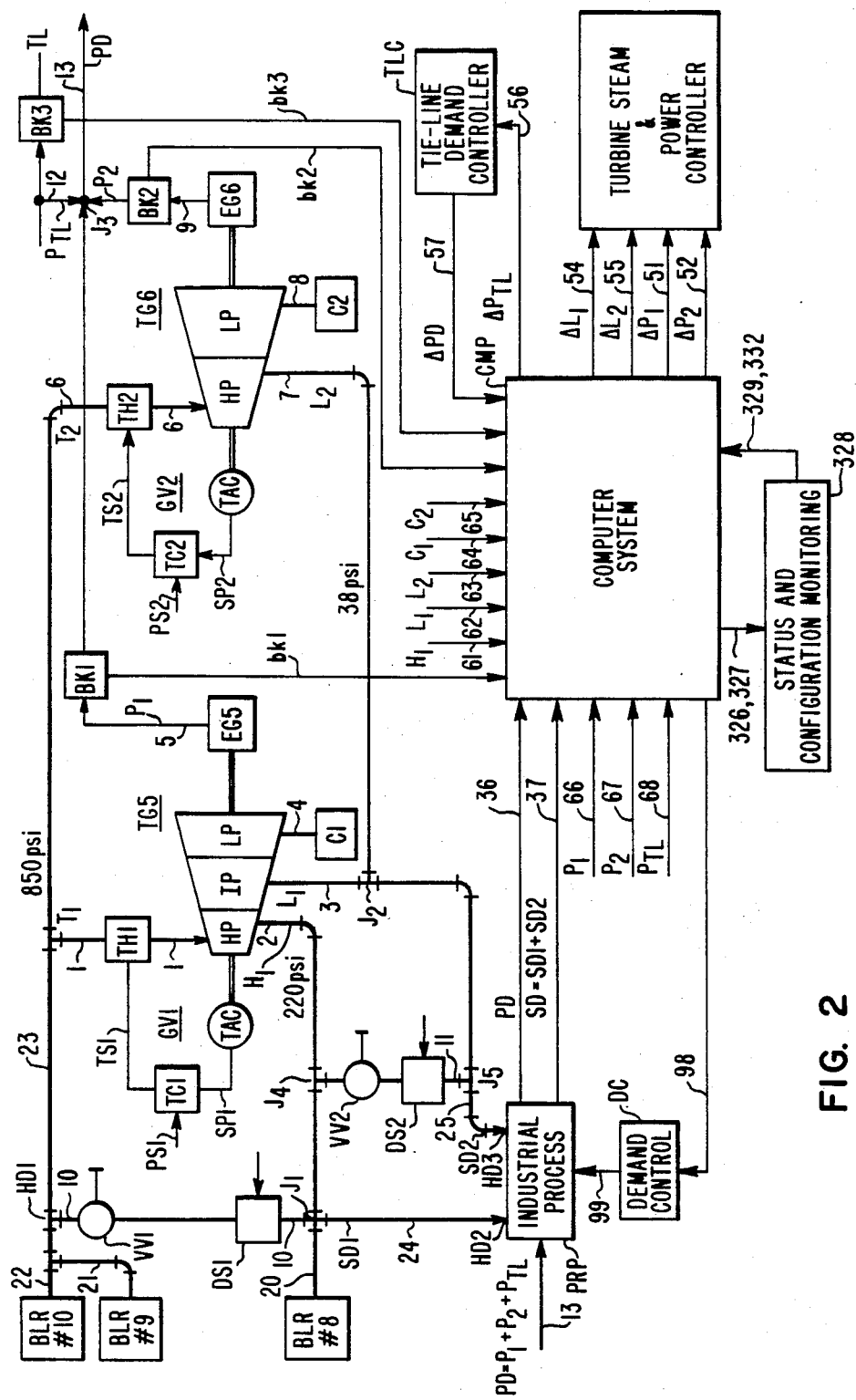
FIG. 2 is a two-turbogenerator group used in the process of FIG. 1 for the purpose of illustration of the preferred embodiment of the invention.

Referring to FIG. 2, the cogeneration process proper typically includes: one low pressure boiler BLR #8 (typically of 210,000 lb/hour steam capacity at 550° F. under 220 psig); one high pressure boiler BLR #9 (typically of 210,000 lb/hour steam capacity at 825° F. under 850 psig); and a second high pressure boiler BLR #10 (typically of 210,000 lb/hour steam capacity at 825° F. under 850 psig).

Boiler BLR #8 supplies to the plant complementary steam at 220 psig and 550° F., via pipes 20 and 24, for the process in accordance with plant requirements for such steam. In addition, the steam demand SD for steam at 38 p.s.i. and 350° F. is supplied to the production processes PRP (lines 3, 7 and 25).

Boilers BLR #9 and BLR #10, by respective lines 21, 22, lead to a header 23 supplying three parallel distribution lines 1, 6 and 10. Line 1 supplies steam to a double extraction condensing turbine TG5. The extractions from turbine TG5 are supplied to the production processes PRP. One extraction by line 2 onto junction J1 connects with lines 20 and 24, namely for steam at 220 psig and 550° F. The other extraction by lines 3 and 25 is steam at 38 psig and 350° F. Line 4 from the lower pressure stage LP of turbine TG5 goes to the condenser C1. Line 6 from header 23 supplies steam at 850 psi to a single extraction turbine TG6. The single extraction is by line 7 to junction J2 between lines 3 and 25, altogether, for steam at 38 psig and 350° F. Thus, lines 24 and 25 carry steam at 220 and 38 psi, respectively, to the industrial process PRP, as required by the steam demand SD. An indication of SD is derived on line 36 from steam demand sensors SD1 and SD2 coupled respectively to lines 24 and 25 which feed the process PRP. Line 8 from turbine TG6 goes to the associated condenser C2. Under steam expansion and correlative loss of enthalpy in turbine TG5 at the speed of rotation, a generator EG5 generates power P1, which is carried by line 5 to a junction node J3 with line 12 from the tie-line TL of the electrical network. A power demand control subsystem is associated with line 12. Similarly, a generator EG6 driven by turbine TG6 generates power P2 which is carried by line 9 to the same junction node J3. From junction J3, an amount of power PD flows via line 13 as demanded by the plant. Wattmeters detect P1 on line 5, P2 on line 9 and $P_{TL}$ on line 12. A complement of power $P_{TL}$, as necessary to meet the demand PD, is derived from the tie-line TL by line 12. The required electrical power PD is fed via line 13 to the industrial process PRP.

Complementary steam at 220 psig and 550° F. from line 20 and boiler BLR #8, at junction J1, is added as necessary to the extracted steam from line 2 on turbine TG5. The 38 psi steam of line 3 from turbine TG5 and the one of line 7 from turbine TG6 add their flow beyond junction J2 onto line 25 to the process.

For steam distribution and for regulation purposes, a first bypass valve VV1 having pressure reduction capability from 850 to 220 psi is installed on line 10 between line 23 and junction $J_1$ on line 2, so as to bypass the high pressure stage of turbine TG5. A second bypass valve VV2 having pressure reduction capability from 220 to 38 psi is installed between junction $J_4$ of line 2 and junction $J_5$ of line 25, to bypass turbine TG5 between its two stages H and L. These two valves can help to determine how much steam (steam flow H1 measured by a flow meter FM) is extracted on line 2 (VV1) and how much steam (steam flow L1 measured by a flow meter FM) is extracted (VV2) from turbine TG5 on line 3 and from turbine TG6 on line 7. In addition, there are a throttle TH1 on line 1 to turbine TG5 and a throttle TH2 on line 6 to turbine TG6, both controlled by the associated governor, e.g. in accordance with the speed of the turbines, to regulate the respective admissions of steam from header 23. Throttle flows $T_1$ and $T_2$ are each measured by a flow meter FM. From an overall consideration of the various supplies of steam, shown illustratively in FIG. 2, it is observed that, depending upon plant demand $SD_1$ of steam at 550° F. and 220 psig on line 24, taking account of the boiler capacity (BLR #8, BLR #9 and BLR #10), of turbine consumption via lines 1 and 6 and of the extraction at 220 psig from turbine TG5 and line 2, the pressure reducing valve VV1 will be controlled accordingly to maintain header pressure above a low limit.

Similarly, if necessary, pressure reducing valve VV2 is actuated in order to supply complementary steam at 350° F. and 38 psig toward junction $J_5$ so as to satisfy the low limit of pressure for this 38 psi header. It is the object of the method and apparatus according to the present invention to optimize the extraction of steam at 350° F. and 38 psig on either turbine ($EX_1$ on line 3 from TG5, and/or $EX_2$ on line 7 from TG6) and the generation of electrical power (P1 on line 5 from EG5 to TG5 and/or P2 on line 9 from EG6 of TG6) in regard to the cost per unit of steam consumed and the cost per unit of electrical energy purchased, so as to meet the demand SD+PD.

Accordingly, the cogeneration process involves the following variables:

TABLE I

| SYSTEM | VARIABLES |
|---|---|
| 1. Turbogenerator TG5 | Throttle flow (T = T1), on line 1 |
| 2. | 220 # extraction flow (H = H1), on line 2 |
| 3. | 38 # extraction flow (L = L1), on line 3 |
| 4. | condenser flow (C = C1), on line 4 |
| 5. | power (P = P1), on line 5 |
| 6. Turbogenerator TG6 | Throttle flow (T = T2), on line 6 |
| 7. | 38 # extraction flow (L = L2), on line 7 |
| 8. | condenser flow (C = C2), on line 8 |
| 9. | power (P = P2), on line 9 |
| 10. Pressure reducing valve | 850/220 # flow (VV1), on line 10 |
| 11. | 220/38 # flow (VV2), on line 11 |

TABLE I-continued

| SYSTEM | VARIABLES |
|---|---|
| 12. Purchased power | $P_{TL}$, on line 12 |

In addition, a number of constraints are involved in each particular situation. Thus, there is a maximum flow of steam possible through the throttle (TH1, TH2), a maximum power P1, or P2, obtainable from the corresponding electrical generator (EG5, EG6). The following Table II lists the several linear equations involved in the optimization process together with the constraints to be respected for a particular combination of variables.

TABLE II

Figure 3A:
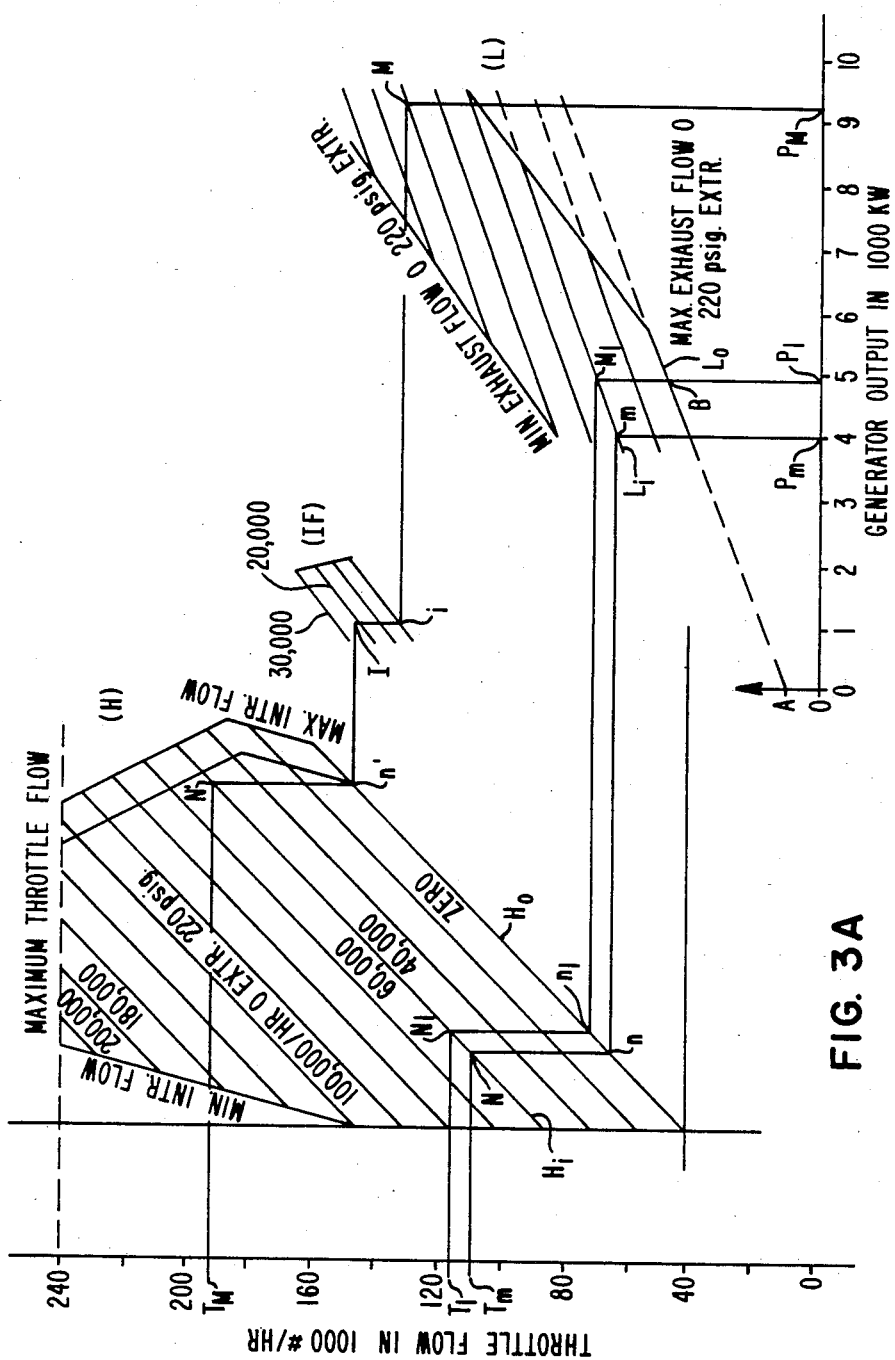
FIGS. 3A and 3B show the steam power characteristics of the two-turbogenerators of FIG. 2, respectively.

| LINE | FUNCTION | DESCRIPTION |
|---|---|---|
| #1 | Turbine TG5 | Maximum throttle flow (for T1, line 1) |
| #2 | | Maximum flow at intermediate pressure (for L1 + C1, lines 3, 4) |
| #3 | | Maximum 38 psi extraction flow (for L1, line 3) |
| #4 | | Maximum power (for P1, line 5) |
| #5 | Turbine TG6 | Maximum throttle flow (for T2, line 6) |
| #6 | | Maximum 38 psi extraction flow (for L2, line 7) |
| #7 | | Maximum Power (for P2, line 9) |
| #8 | Turbine TG5 | Mass flow balance from transform relationship T1 = H1 + L1 + C1 (1) |
| #9 | Turbine TG6 | Mass flow balance from transform relationship T2 = L2 + C2 (2) |
| #10 | Turbine TG5 | Throttle flow equation from the characteristic curves of FIG. 3A: T1 = 12,000 + 0.75 × H1 + 0.5 × L1 + 8 × P1 (3) |
| #11 | Turbine TG6 | Throttle flow equation from the characteristic curves of FIG. 3B: T2 = 12,400 + 0.5 × L2 + 8.57 × P2 (4) |
| #12 | Header HD2 | Mass flow balance to generate net process demand SD1 (line 24) SD1 = H1 + (1.124 · VV1) − VV2 (5) |
| #13 | Header HD3 | Mass flow balance to generate net process demand SD2 (line 25) SD2 = L1 + L2 + 1.085 VV2 (6) |
| #14 | Power Bus | PD = Power Consumption (line 13) where PD = P1 + P2 + $P_{TL}$ (7) |
| #15 | Turbine TG5 | Minimum Power |
| #16 | Turbine TG5 | Minimum Condenser Flow |
| #17 | Turbine TG6 | Minimum Power |
| #18 | Turbine TG6 | Minimum Condenser Flow |

The equations of Table II can be translated by the following Table III into a matrix.

TABLE III

| | TG5 | | | | TG6 | | | | VV1 850/275 | VV2 220/38 | $P_{KW}$ |
|---|---|---|---|---|---|---|---|---|---|---|---|
| | T1 1 | 220 2 | 38 3 | C1 4 | P1 5 | T2 6 | 38 7 | C2 8 | P2 9 | 10 | 11 | 12 |
| 1 | 1 | | | | | | | | | | | ≦240,000 |
| 2 | | | 1 | 1 | | | | | | | | ≦140,000 |
| 3 | | | 1 | | | | | | | | | ≦150,000 |
| 4 | | | | | 1 | | | | | | | ≦9,500 |
| 5 | | | | | | 1 | | | | | | ≦13,500 |
| 6 | | | | | | | −1 | | | | | ≦130,000 |
| 7 | | | | | | | | | 1 | | | ≦9,500 |
| 8 | 1 | −1 | −1 | −1 | | | | | | | | =0 |
| 9 | | | | | | 1 | −1 | −1 | | | | =0 |
| 10 | 1 | −.75 | −.5 | | −8 | | | | | | | =12,000 |
| 11 | | | | | | 1 | −.5 | | −7.2 | | | =12,400 |
| 12 | | 1 | | | | | | | | 1.124 | −1 | =135,700 |
| 13 | | | 1 | | | | 1 | | | | 1.085 | =47,120 |
| 14 | | | | | 1 | | | | 1 | | | 1 | =12,745 |
| 15 | | | | | 1 | | | | | | | ≧4,000 |
| 16 | | | | 1 | | | | | | | | ≧10,000 |
| 17 | | | | | | | | | 1 | | | ≧3,000 |
| 18 | | | | | | | | 1 | | | | ≧10,000 |
| COST | | .00672 | | | | .00672 | | | | .00672 | | .0435 |

The last line in Table III indicates the costs of steam consumed and of power purchased, while the last column illustratively indicates the magnitudes of the constraints existing in the system.

In Table II, mass flow equation (1) line #8 merely expresses that for turbine TG5 the quantity of steam entering (line 1 of FIG. 2) is equal to the sum of the quantities of steam exiting (lines 2, 3 and 4 of FIG. 2). Similarly, equation (2) (line 9) is the mass flow equation for turbine TG6, translating the fact that the steam entering by line 6 is totally divided between extraction line 7 and condensing line 8 of FIG. 2.

Equation (3) of Table II is a dynamic equation accounting for the expansion of steam coming from the throttle (TH1) as a steam flow T1 through turbine TG5, performing work and generating power (P1) with an extraction of steam (H1, L1) thereafter.

Regarding turbine TG5, referring to FIG. 3A, characteristic curves are shown following a linear equation of the general form:

$$T = a_0 + a_1 H + a_2 L + a_3 P.$$

For zero power (P=P1=0) and zero extraction (H=H1=0, L=L1=0), the value of $a_o$ may be said to represent the minimum steam admitted through the throttle (TH1) in turbine TG5 in order just to overcome inertia and account for losses. This value is represented by the ordinate of the intersecting point A between line $L_o$ (zero extraction on FIG. 3A) with the vertical ordinate axis (zero power P). OA=12,000 lbs/hour in the illustration shown by the curves of FIG. 3A for turbine TG5. For a given operative point M1 in the second stage of the turbine, (curves (L) in FIG. 3A) situated on the L1 characteristic, $a_2L1$ is the vertical translation from B (zero extraction) to M1 (extraction L1). In the example, L1 is equal to 40,000 lbs/hour. In terms of steam flow, the cogenerated power P1 along the power axis is converted from kilowatts into units of steam flow by the coefficient $a_3$=8. For the first stage, the operative point M1 is translated horizontally to the zero extraction point n1 (on $H_o$) in the (H) family of curves. The gain of curves (H) for turbine TG5 are $a_1$=0.75 as stated in line #10 of Table II and in line #10 of the matrix of Table III. The ordinate N1 of point n1 on the 60,00 lbs/hour characteristic defines the throttle flow T1 as 119,000 lbs/hour. Thus, in equation (3), for TG5, $a_3=8$; $a_2=0.5$ and $a_1=0.75$.

Figure 3B:
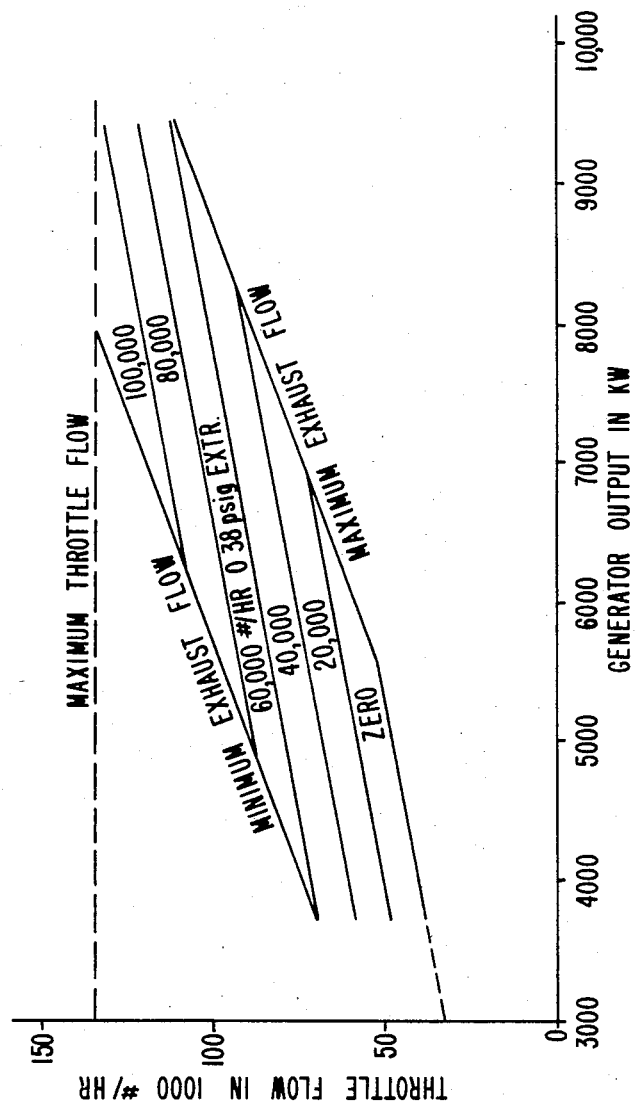

Similarly, FIG. 3B illustrates with one family of curves the dynamic transformation in terms of steam (lbs/hour) from throttle flow T2 under expansion, in the single stage of turbine TG6, to generate electrical power (P2) and supply steam by extraction to the industrial process, in accordance with equation (4) of Table II. Thus, in equation (4) the coefficients are $a_3=7.2$; $a_2=0.5$; and $a_1=0$.

From a comparison of equations (1) and (3) it appears that by relying only upon mass flow, the controlling variables (T1, H1, L1, C1 and P1 for turbine TG5, and similarly T2, L2, C2 and P2 for turbine TG6) are interrelated. Therefore, only a few of the parameters need to be modified when seeking optimization in the distribution of steam in and between turbines and of generated power. Having chosen those few parameters, all the others are determined by simple mathematical calculations. Once the optimization technique has been exercised and a preferred distribution of steam and electrical power has been found for each and between both turbines, the system is adjusted, preferably under the teachings of copending patent application Ser. No. 548,478 filed Nov. 3, 1983. Accordingly, the throttles (TH1 and TH2) are given a set point and the values of the extractions (EX1 and EX2), as well as the condenser flow (C1 and C2), are also adjusted. In other words, advantage is taken of the cost improvement indicated by the optimization process to satisfy the present demand (SD and PD) of the industrial process.

Referring again to FIG. 3A, for the purpose of illustration, it is assumed that P1 the cogenerated power from turbine TG5, cannot be less than 4000, or more than 9200 kilowatts. These constraints determine the total throttle flow for the two operating points M1 on the 40,000 lbs/hour line (L1), and M2 on the assumed maximum extraction flow line of 100,000 lbs/hour (L2). The steam characteristics of turbine TG5 are shown to include an intermediary flow family of curves (IF) ranging from zero to 30,000 lbs/hour through which operative point M', by i on the zero line and I on the 20,000 lbs/hour line, rejoins a point n' in the (H) family of curves and a point N' on the 60,000 lb/hour line thereof, namely the operative point for the first stage. Accordingly, a maximum throttle flow value TM is defined by the ordinate of N', illustratively 186,000 lbs/hour, the minimum throttle flow value Tm being 119,000 lbs/hour in relation to operative points M', N.

The curves of FIGS. 3A and 3B are given by the manufacturer. They have been generally used in the past in order to calculate the flow versus generated power relationship for a turbine. Advantage has been taken of this in the present invention, since by using only mass flow equations and the mass flow versus power relationship no recourse is necessary to any entropy or enthalpy determination, when performing the optimization function.

Reference will now be made to the constraints expressed in the last column of the matrix of Table III, in the light of the installation of FIG. 2. Line #1 of Table III expresses that throttle flow T1 for turbine TG5 has a maximum constraint of 240,000 lbs/hour. Limitations due to section flow are expressed in line #2 for the 38 psi extraction of line 3 and for the condenser line 4, i.e. EX1 and C1 can have a limited combined flow of 140,000 lbs/hour. Also the condenser extraction C1 cannot be less than 10,000 lbs/hour as stated in line #15. Line #3 states that power $P_{TL}$ derived from the tie-line cannot exceed 6000 KW, whereas line #4 states that P1, the cogenerated power, is less than 9500 KW and more than 4000 KW (line #14). Similarly, for TG6 the constraints are: $T2 \leq 135,000$ lbs/hour; $3000 \text{ KW} \leq P2 \leq 9500$ KW and C2, $\leq 10,000$ lbs/hour. Lines #10 and #11 translate the linear equations (3) and (4), respectively, of Table II, where $T1 \leq 12,000$ lbs/hour and $T2 \leq 12,400$ lbs/hour.

Lines #11 and #12 are related to the pressure reducing valves VV1, VV2 used respectively for pressure reduction by the psi ratios 850/225 (column 10) and 225/38 (column 11). Referring to FIG. 2, pressure reducing valve VV1 converts steam at 850 psi on line 10 to saturated steam at 225 psi by the addition of desuperheating water, passing it down to junction J1. Steam at 225 psi collects from VV1, but also from line 2, i.e. the extraction EX1 from TG5. The total steam from junction J4 goes to junction J1 where it adds up with steam from line 20 directly from boiler BLR #8. At header HD2 the steam consumption by the plant from junction J1 is SD1 on line 24. Pressure reducing valve VV2 converts steam from J4 at 225 psi on line 11 into saturated steam at 38 psi, again by the addition of desuperheating water. Junction J5 collects extraction steam at 38 psi from VV2 and from junction J2 common to line 3 of TG5 and line 7 of TG6. The steam at 38 psi is collected at junction J5 and fed by header HD3 to the plant by line 25 as a steam demand SD2. SD1 and SD2 represent the total steam demand SD of the plant PRP. Accordingly, line #11 of Table III expresses SD1 in terms of the flow from pressure reducing valve VV1 and also pressure reducing valve VV2, with a net flow of SD1 equal to 135,700 lbs/hour, thus, at junction J1. The relationship is:

$$SD1 = H1 + 1.124VV1 - VV2 \qquad (5)$$

Similarly, line #12 of Table III states SD2 in terms of the flow from pressure reducing valve VV2 and of 38 psi steam from both TG5 and TG6 for an output at junction J5 of 47,120 lbs/hour. The relationship is:

$$SD2 = L1 + L2 + 1.085VV2 \qquad (6)$$

Referring again to FIG. 2, cogenerated power P1 on line 5 from the EG5 generator coupled to turbine TG5 and cogenerated power P2, on line 9 from the EG6 generator coupled to turbine TG6, are added up with complementary power $P_{TL}$ derived from the tie-line TL by line 12, to provide on line 13 a total power PD which is supplied by line 13 to the industrial plant. In this regard, line #13 of Table III expresses that the total power consumed (columns 5, 9 and 12) is equal to 12,745 kilowatts.

The last line of the matrix of Table III indicates the initial cost of steam (T1, T2) subsequently expanded through turbines TG5, TG6 and the steam passed to the pressure reducing valve VV1, thus bypassing turbine TG5. It also indicates the cost of complementary power $P_{TL}$ purchased from the tie-line TL. These costs are illustratively 0.006727 per unit of steam consumed and 0.0435 per unit of electrical energy purchased.

In this case it is more expensive to cogenerate power P1, or P2, through steam expansion through the turbine, than to purchase it from the tie-line. In another situation it could be the reverse. When evaluating the optimal distribution between steam through turbines TG5 and TG6 and between extraction EX1 (line 2), EX2 (line 7), condenser outputs C1, C2 (lines 4 and 8) and power cogenerated P1, P2 (lines 5 and 9) the conclusion as to what the optimal result is will take into consideration whether power purchased $P_{TL}$ is more, or less costly, than cogenerated power.

Two preferred optimization techniques are contemplated with the above-stated mass flow approach to controlling a cogeneration process for the consumption of steam and power.

One approach is known as the linear programming optimization technique. In this respect see: "Linear Programming and Extensions" by George B. Dantzig (1963-Princeton University Press); and "Optimization of the Design Of Combined Heat and Power Schemes: A Linear Programming Approach" by J. A. Bleay and Ian Fells in Journal Of the Institute of Energy, September 1979, pp. 125–139. In Appendix A four cases of optimization with the linear programming technique as applied to the system of FIG. 2 are given for the purpose of illustration.

Another optimization approach described in copending patent application Ser. No. 550,164 consists in applying the aforementioned EVOP method of optimization within the context of the aforestated mass flow treatment of the process variables in a multi-unit turbogenerator steam-power cogeneration process. The EVOP method is explained in an article by Carpenter and Sweeney in *Chemical Engineering* of July 5, 1964, pp. 117 $\propto$ 126. Off-line treatment by the EVOP method is performed with a model based on mass flow balancing in a multiturbogenerator cogeneration installation. Throttle and extraction flow control is, then, effected in accordance with the off-line results.

Referring again to FIG. 1, the production processes require at a given moment so much steam and so much electrical power (SD and PD). The system according to the present invention is adjusted to control the cogeneration process CP so that, within a very short time, typically the duration of a microprocessing complete calculation with a specially selected algorithm, the optimal proportions of steam flows, to and from TG5 and TG6, and generated as well as purchased power are calculated which will satisfy quantities of steam on line 26 to SD and on line 13 to PD, at minimum cost.

Referring to FIG. 2, within the cogeneration process the allocation of steam and power in accordance with microprocessing operations and conclusions thereof affects the flows of steam at 220 psi 550° F. (lines 20, 2, 10 and 24) and at 38 psi 350° F. (lines 3, 7, 11 and 25), namely the steam extractions EX1, EX2, for a given steam supply from boiler BLR #8. It also affects the exhaust to the condensers C1, C2. Moreover, the demanded total steam from boilers BLR #9 and BLR #10 which is determined by the throttle flow on lines 1 and 6, is as called for by the governor (GV1 for TG5, GV2 for TG6), the setting of which is fluctuating and controlled in the same process.

Figure 4:
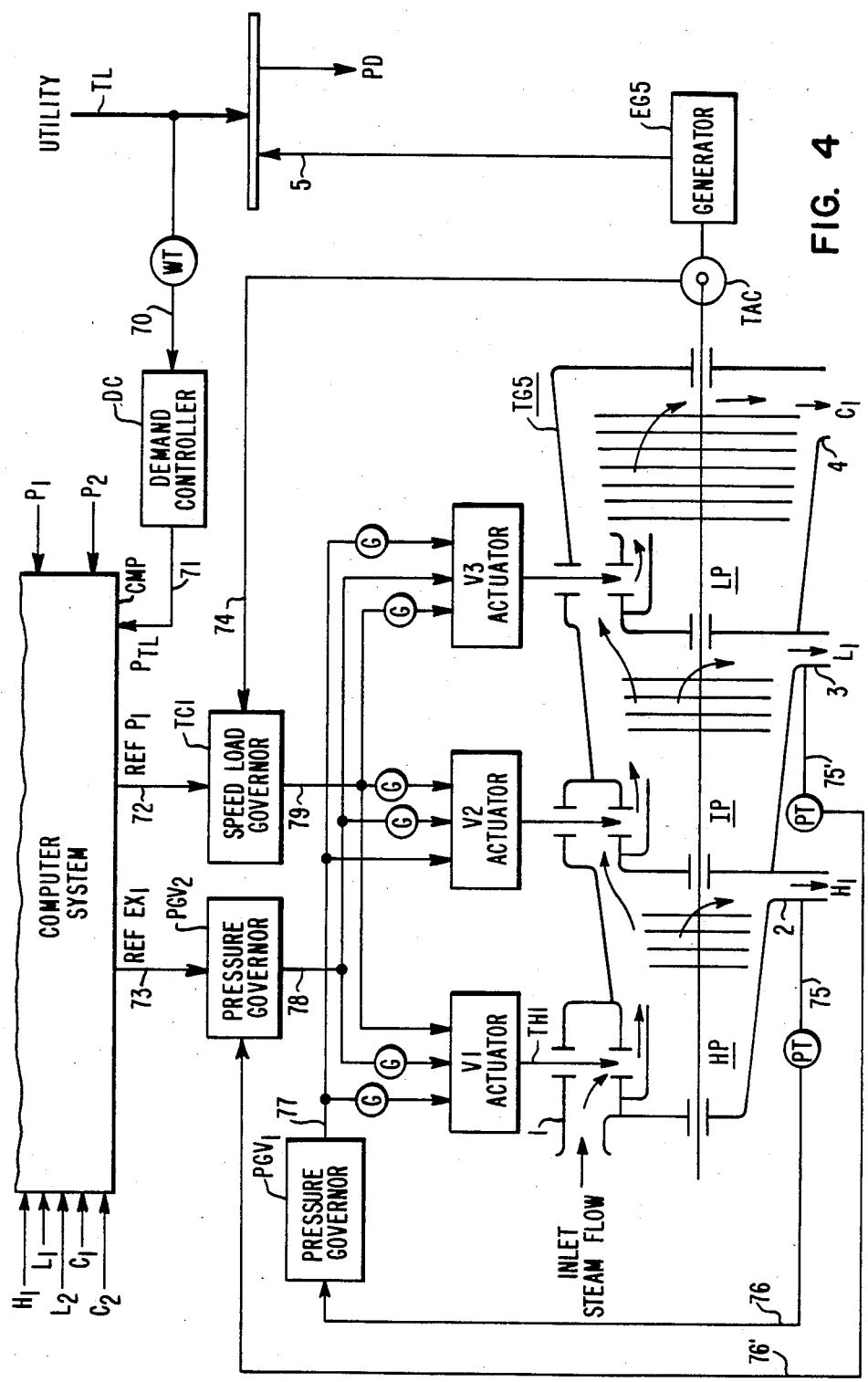
FIG. 4 illustrates interaction between the control system and the speed and pressure governors and valve actuators typically installed on one turbine.

Referring to FIG. 4, for turbine TG5, governor GV1 includes a speed load governor TC1 controlling by line 79 the throttle valve TH1. The turbine control system also includes two pressure governors PGV1, PGV2 responsive to pressure signals respectively derived on lines 76 and 76' from pressure transducers PT. Pressure governor GV1 controls by lines 77 actuators V1, V2 and V3 of the high, intermediate and low pressure sections, respectively. Pressure governor GV2 controls the same by lines 78. It is observed that the gain G between a given governor and a given actuator can be less than unity when the signal is provided for the purpose of internal decoupling. Similarly, turbine TG6 is provided with a speed load governor, or throttle controller TC2 and a pressure governor PGV3 (not shown), within the governor GV2, under respective control setting signals for the speed and for the pressure, respectively. A change of extraction $\Delta EX1$ on line 3 and a change of power $\Delta P1$ from generator EG5 are imparted by the computer system CMP, after optimization, by imposing a reference setting EX1 through line 73 for PGV2 and a reference setting PS1 through line 72 to TC1 for TG5 in FIG. 4. Similarly, CMP controls TG6 to prescribe a new value of EX2 by a reference setting upon PGV3 (not shown) and/or P2 by a reference setting PS2 to TC2 for TG6. The allocation of steam determines the distribution of generated powers P1, P2 between turbines TG5 and TG6 in accordance with the microprocessing operation. Finally, in the optimization evaluation by the computer system CMP, the optimal complement of power $P_{TL}$, to be derived on line 12 from the tie-line network, is also ascertained. Such amount of energy purchased from the network is depending, in the optimization process, upon whether it is cheaper, or more expensive, to generate power (P1+P2) locally, or to purchase some power $P_{TL}$ from the network.

When tripping occurs, taking equipment out of service, this is illustrated in FIG. 2 by switch breakers BK1 for the power generated by TG5 on line 5, BK2 for the power generated by TG6 on line 9, and BK3 for the power supplied on line 12 by the tie line TL. Corresponding lines bk1, bk2 and bk3 respond to such switch breaking to convey the new status of the equipment to the computer system CMP. This will come into consideration for the identification of the new discontinuous plane, by monitoring at 328.

The operation of the optimization process uses the matrix of equations stated in Table III, and, for instance, the EVOP model for optimization with microprocessing techniques.

As explained in copending patent application Ser. No. 550,164 filed Nov. 8, 1983, with the linear programming approach, at the start it is ascertained whether there is power generated or not, namely by turbogenerators TG5, TG6. This is a test whether the turbine circuits are set in motion beyond the minimum power level, or whether they have been shut down. If there is no power, the throttle flow of each turbogenerator unit (TG5, TG6) is determined using the throttle flow equation of Table III (equation (3) for TG5, equation (4) for TG6). To this effect, powers P1, P2 are sensed with wattmeters on lines 5 and 9, respectively. The steam extractions (H1, L1) of lines 2 and 3, respectively, for TG5 and (L2) of line 3 for TG6, are sensed by flowmeters mounted on those lines (FIG. 2). Considering equation (3) for the purpose of illustration, which assumes at zero output a minimum throttle flow of 12,000 lbs/hr, the values measured are set into the equation as follows:

$$T1 = 0.75H1 + 0.5L1 + 8P1 + 12{,}000 \tag{3}$$

thereby to derive the throttle flow value T1. The same is done with equation (4) of Table III to derive the value of throttle flow T2 for the TG6 unit:

$$T2 = 0.05L2 + 7.2P2 + 12{,}400 \tag{4}$$

Then, the mass flow balance is expressed by equations (1) and (2), which leads to the determination of the values C1 and C2 for condenser steam, since:

$$T1 = H1 + L1 + C1 \text{ and } T2 = L2 + C2 \quad (2)$$

At this stage all parameters P1, T1, H1, L1, C1, P2, T2, L2 and C2 are known. These will be used for optimization.

It is recalled that the EVOP model approach is being based on disturbances exercised on the system under the guidance of a planned succession of tests. It is important here to consider how steam flow distribution and power are brought to converge toward an optimal relationship.

Once an optimal relationship has been established, control is effected.

Referring to FIG. 2, the industrial process PRP, at a given moment, receives via line 13 electrical power $PD = P1 + P2 + P_{TL}$, where $P_{TL}$ is the amount purchased from the utility company (tie-line TL). It also receives steam $SD = SD1 + SD2$ from headers HD2, HD3 and lines 24 and 25. The steam consumed may be, on line 24, steam at 220 psi resulting from the upper stage (HP on line 2) of TG5, or steam bypassed through pressure reducing valve VV1 from the 850 psi header HD1 (line 21 from boiler BLR #9 through line 24, after junction J1 and line 10). The steam of line 24 may also come directly as a complement from line 20 and boiler BLR #8. On the other hand, the steam of line 25 is steam at 38 psi provided either from the L1 extraction of section LP in TG5 (line 3) and the L2 extraction of section LP in TG6 (line 7), or it may result from bypassed steam through pressure reducing valve VV2, from line 2 and junction J4.

The process demand is the sum of the power demand $PD = P1 + P2 + P_{TL}$ and the steam demand $SD = SD1 + SD2$. A computer is provided with input signals representing PD (line 38), SD (line 37), H1 (line 61), L1 (line 62), L2 (line 63), exhaust C1 from the condenser of TG5 (line 64), exhaust C2 from the condenser of TG6 (line 65), P1 (line 66), P2 (line 67) and $P_{TL}$ (line 68). As a result of computations explained hereinafter, the control process is conducted with command signals $\Delta P1$ (line 51), $\Delta P2$ (line 52), $\Delta H1$ (line 53), $\Delta L1$ (line 54), and $\Delta L2$ (line 55), to the turbine, and $\Delta P_{TL}$ (line 56) to the tie-line. These control signals, derived in accordance with the present invention, superimpose on the overall management process control of the industrial plant a refining optimization control or adjustment process control, also effected according to the present invention.

The command signal $\Delta P1$ of line 51 goes to the speed setting input of throttle controller TC1 which, in response to a tachometer TC associated thereto in relation to the turbine TG5 and generator EG5, regulates the throttle TH1 in the steam pipe 1 to the high power stage H of the turbine. As a result, the generated power P1 of EG5 on line 5 is in fact regulated by signal $\Delta P1$, so as to achieve generator speed according to the speed setting. In the same manner, signal $\Delta P2$ of line 52 goes to throttle controller TC2 of turbine TG6 and contributes to adjusting the opening of throttle TH2 of steam pipe 6, thereby to modify P2 on line 9 from generator EG6. The extraction EX1=L1 of turbine TG5 is modified by command signal $\Delta L1$ of line 54, while the extraction EX2=L2 is modified on turbine TG6 by command signal $\Delta L2$ of line 55.

Typically, generators EG5, EG6 are AC synchronous machines, so that a change of speed setting entails a change in power. The governors (GV1, GV2) are part of pressure and speed control loops including the throttle controller (TC1, TC2) and the throttle valve (TH1, TH2).

FIG. 4 schematically shows conventional speed and pressure governors and valve actuators installed, for illustration, on turbine TG5. Actuator V1 controls the pressure of the steam in the high pressure section HP of the turbine by controlling throttle TH1 admitting more or less steam from steam line 1 in response to control line 79 from speed governor TC1. Similarly, actuator V2 controls the intermediate flow into the low pressure section LP of the turbine. Pressure sensed via line 75 and pressure transducer PT at the extraction outlet 2 is used by line 76 to establish through pressure governor PGV1 the desired constant 220 psi steam pressure in extraction line 2. Also similarly, actuator V3 controls the admission of steam from the LP section into the condenser section in response to control line 28 from pressure governor PGV2. Pressure, sensed via line 25' and pressure transducer PT at the low pressure outlet 3, is used by line 76' to establish through pressure governor PGV2 the desired constant 38 psi steam pressure in extraction line 3. In addition, pressure governor PGV2 is modified by a setting change $\Delta EX1$ prescribed on line 73 by the computer system CMP as a result of optimization; whereby actuator V3 establishes a steam flow value L1=EX1 at the extraction line 3 and a condenser exhaust flow C1 from line 4. In the same fashion, tachometer TAC by line 74 establishes a power setting P1 onto the speed load governor TC1, which is itself affected by a setting change imposed from line 72 by the computer system CMP as a result of optimization.

Parallel lines from lines 77, 78 and 79 to the two actuators, other than the one controlled as hereabove stated, differ by the provision of gains G less than unity on each such additional lines, in accordance with generally known turbine control practice.

FIG. 4 has been described illustratively for turbine TG5 of FIG. 2. Pressure governor and speed governor are readily conceived in similar terms for establishing a steam extraction EX2 in response to a change $\Delta EX2$ imparted from the computer system and cogenerated power P2 in response to a change $\Delta P2$ imparted from the computer system in the case of turbine TG6 of FIG. 2. A demand control loop is installed, showed illustratively on FIG. 4, extending from the tie-line of the utility company via the associated wattmeter, line 70, demand controller DC and line 71 to the computer system CMP. The demand controller is according to the teachings of U.S. Pat. No. 3,872,286. There is also a decoupling control loop for instance such as given in copending patent application Ser. No. 540,478. The hydraulic control, by playing on the extractions (EX1, EX2) in accordance with the pressure set points maintaining a given pressure, determines the amount of condenser exhaust (C1, C2). The hydraulic loop maintains the pressure by adjusting the condenser exhaust, throttle flows and speed. When control is exercised either under demand control changing the electrical load distribution in the plant, or under optimization control, or both, the change in the amount of power (P1, P2) cogenerated and tie-line power $P_{TL}$ drawn is determined by the change of steam flow distribution between the two units and through the decoupling algorithm, described in the copending patent application, when adjusting the pressure settings.

For a total steam flow $T=T1+T2$ in header HD1 to units TG5 and TG6, the total steam flow T is equal to the sum of the extractions and condenser flows $T=H1+EX1+EX2+C1+C2$. Should one of the extractions be fixed, for instance EX1, the other extraction EX2 is equal to $T-EX1-C1-C2$. A change of power P2 will be effected by adjusting EX2. If the extractions are fixed, adjustment may take place on C1 and C2, e.g. on the condensers, and if C1 is fixed, adjustment will be only on C2, assuming it lies above its low limit. Thus, considering control action on TG6, increasing C2 will increase P2, whereas decreasing EX2 will cause an increase of the power P2 according to generally known turbine energy conversion principles.

More generally, the hydraulic loop will control and maintain the pressure in accordance with condenser exhaust, throttle steam flow and turbine speed, while by optimization the control settings are adjusted toward the optimum solution, establishing the relationship between extractions EX1, EX2, the throttle steam flows (T1, T2), the condenser flows (C1, C2), and leading to cogenerated powers P1, P2 and tie-line power $P_{TL}$.

Control is effective with a turbine generator unit on automatic (AUTO). Therefore, it is necessary to ascertain whether one turbine, or the other, or both, are on AUTO before practicing the optimization process.

From a general consideration of FIG. 4 which relates to turbine TG5, and of a governor control system similarly applicable to turbine TG6, it appears that, with the turbine set on MANUAL, the operator in the plant will establish the settings for the pressure governor coresponding to a chosen and stable operative mode considering actual demand in steam and/or power. Then, the turbines are set on AUTO, whereby the computer system CMP will calculate an optimum setting and/or a demand control setting which entails changes on lines 72, 73 of turbine TG5, for instance. The setting changes, required to obtain the calculated optimum or to meet demand control requirements, are effected with contactors moved by small motors rotating in either direction (according to the sign of the error from the present setting) during a lapse of time which represents the magnitude of the change (or error to be nullified) to be performed. Thus, the signals outputted by computer system CMP on lines 72 and 73 of FIG. 4, for instance, which represent the optimization results, are converted into time lapses of motor operation with the contactors.

Figure 4A:
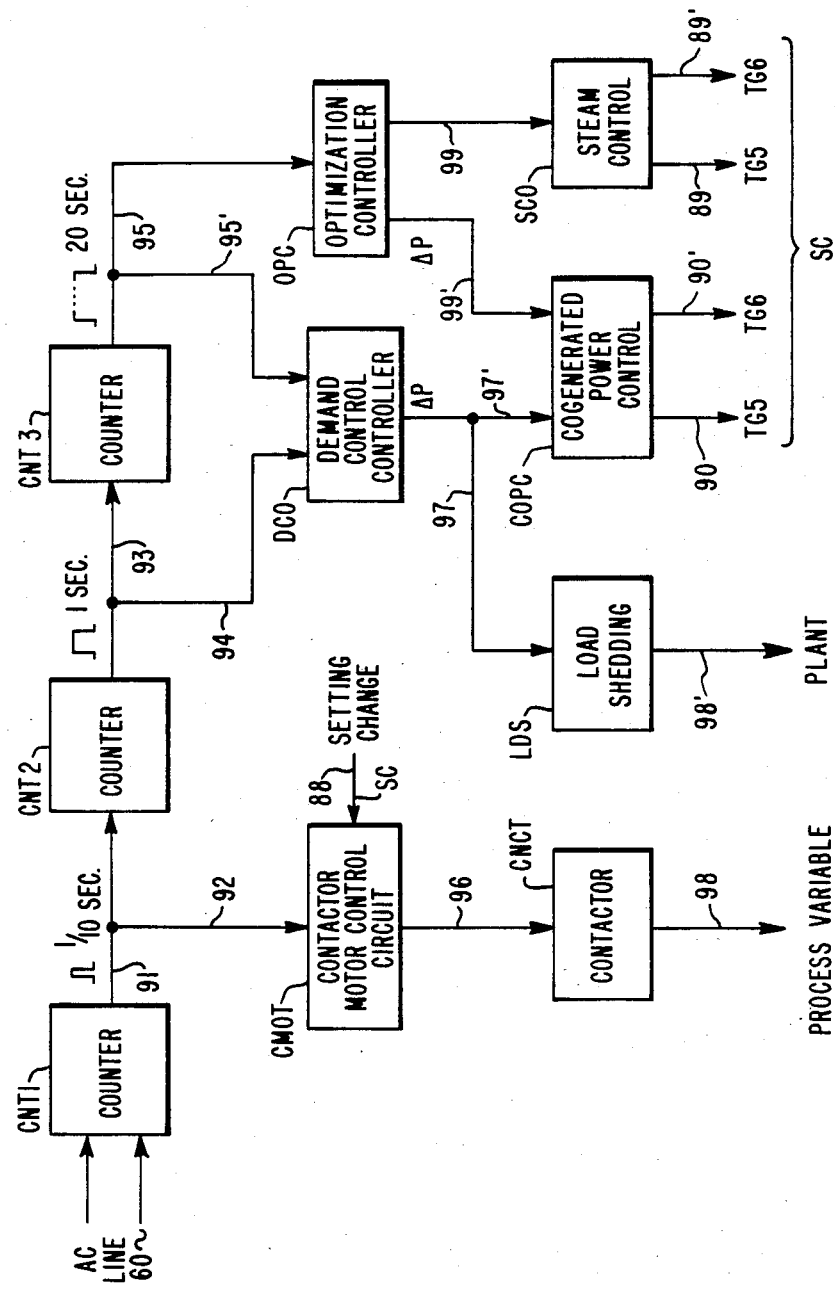
FIG. 4A illustrates a gating system for the several programs and functions of the computer system controlling a hydraulic controlled turbogenerator system as shown in FIG. 4.

Referring to FIG. 4A, the 60 period AC line is coupled to a counter CNT1 synchronized with the zero-crossings. The output of counter CNT1 establishes a 1/10 of a second time interval (typically) defining the resolution of contact closure under the contact closure control program. FIG. 4A shows by lines 91 and 92 control of the contactor motor control circuit CMOT having a setting change SC imposed by line 88 for the particular process variable (for instance cogenerated power P1 on line 72 of FIG. 4, or the extraction EX1 required on line 73 thereof for the steam on TG5). Circuit CMOT translates on line 96 the control into motion for the contactor CNCT for the same process variable (via line 98).

Line 91 is inputted into a second counter CNT2 the output of which on line 93 defines a time interval occurring every one second (typically). This time interval is used on line 94 for the demand control period count within demand controller DCO. Therefore, for instance, every second the time into the demand control period is updated. As a result, at the end of the demand period (typically 15 minutes) the assigned demand limit will be achieved by the demand controller following a first period of No Control, followed by a Deadband Control period, and finally with a last period of Adjustable Bias and No Deadband Control. Control may be by 97 to have load shedding (LDS) and action in the plant by 98' or by 97' to increase the cogenerated power through circuit COPC to compensate for power reduction (for instance on the tie line, $P_{TL}$) and maintain the demand PD. Cogenerated power reduction may be by 90 on TG5, or by 90' on TG6. These actions are causing corresponding setting changes SC for the process variables (P1 or P2).

The time interval of line 93 is triggering a third counter CNT3 which establishes on its output line 95 a third time interval, typically of 20 seconds. This is the recurrence of optimization by the optimization controller OPC and of exercising of the demand control algorithm, namely by line 95' to DCO. Accordingly, via 99 on the output from optimization controller OPC, steam control is effected (circuit SCO to provide on line 89 for TG5 an extraction flow EX1, or on line 89' for TG6 an extraction flow EX2, while via line 99' a change of cogenerated power may be required affecting circuit COPC also translated into a change ΔP1 for TG5 on line 90, or a change ΔP2 for TG6 on line 90'.

Control for optimization will involve the question whether one governor is on AUTO or not, because when both governors are on Manual (MAN), nothing can be done to optimize. If only one governor is on Manual (MAN), for instance on turbine TG5, then the extraction $EX1=H1+L1$ is set on Manual. The reason is that since TG5 is on Manual, control of the steam distribution has to be exercised on EX2 and/or C2 of the other turbine TG6. It is necessary to fix EX1 at a given flow amount. If the Manual status is on turbine TG6, the reverse situation is in order. The question is also raised whether either extraction has been set on Manual. If it is Yes, they are both placed on Manual and one is adjusted against the other, manually. After this has been done, the optimizing steps are being carried out with a given set of perturbances effected on the EVOP model during optimization as explained in copending application Ser. No. 550,164, or through linear programming steps, depending upon the chosen method of optimization.

The total power P and the total extraction are determined on the basis of the inputs for power and for the extractions. Line wattmeters and flowmeters are providing this information. In this regard, it is recalled that EX1 and EX2 have been determined and that the calculation provides the sums $P=P1+P2+PTL$ and $EX1+EX2=EX$. In the latter regard, when necessary, steam flow derivation by pressure reducing valve VV2 will be taken into account in keeping with column 10 of the matrix of Table III.

It has been hereabove explained, by reference to FIG. 2, how the distribution of steam and power can be optimized for a given matrix characterizing the system under a certain availability of the equipment. The optimization method has been illustrated in its most practical implementation and fastest performance with mass flow balancing either by applying the EVOP method of copending patent application Ser. No. 550,164, or by linear programming. This approach which relates to a matrix, e.g. to one set of active equipment: boilers, turbines, pressure lines, connecting and pressure reducing or let-down valves, can be considered as being performed in one plane. In such plane, the optimization methods lead to valve settings, establishing required steam inlets and outlets for the pipes at different pressures, governor valve settings for the turbines, valve settings for the desired extraction and condenser flows, as prescribed by the optimization solutions. It may be required in an emergency to add or take away boiler inputs, to add, or take away turbines, to use more, or less input pipes or output pipes, thus changing the overall mass flow distribution in the pipe system under possible new demands for steam and power. Each such new configuration determined by the availability of the equipment characterizes a new "discontinuous plane" for control which lends itself to the determination of an optimal steam and power distribution throughout the system. For each such configuration the optimization method can be said to be applied within such a particular "discontinuous" plane. Whenever a new configuration enters into the picture, status monitoring sets the conditions initially for the new plane in anticipation of a new matrix being used leading to the optimization settings under the optimization process to be performed with the new matrix of the system.

On the other hand, when a pressure reducing valve is to be controlled to cope with an emergency and restore the steady state at the new level of pressure and flow prescribed in the discontinuous plane, "switching" from one plane to the next through the emergency is performed as explained hereinafter by reference to FIG. 7. More generally, the invention pertains to a multiplane optimization method and apparatus which is most suitable for cogeneration of steam and power, but not exclusively.

The invention will now be explained with regard to its implementation and mode of operation by reference to FIGS. 5 and 7.

Figure 5:
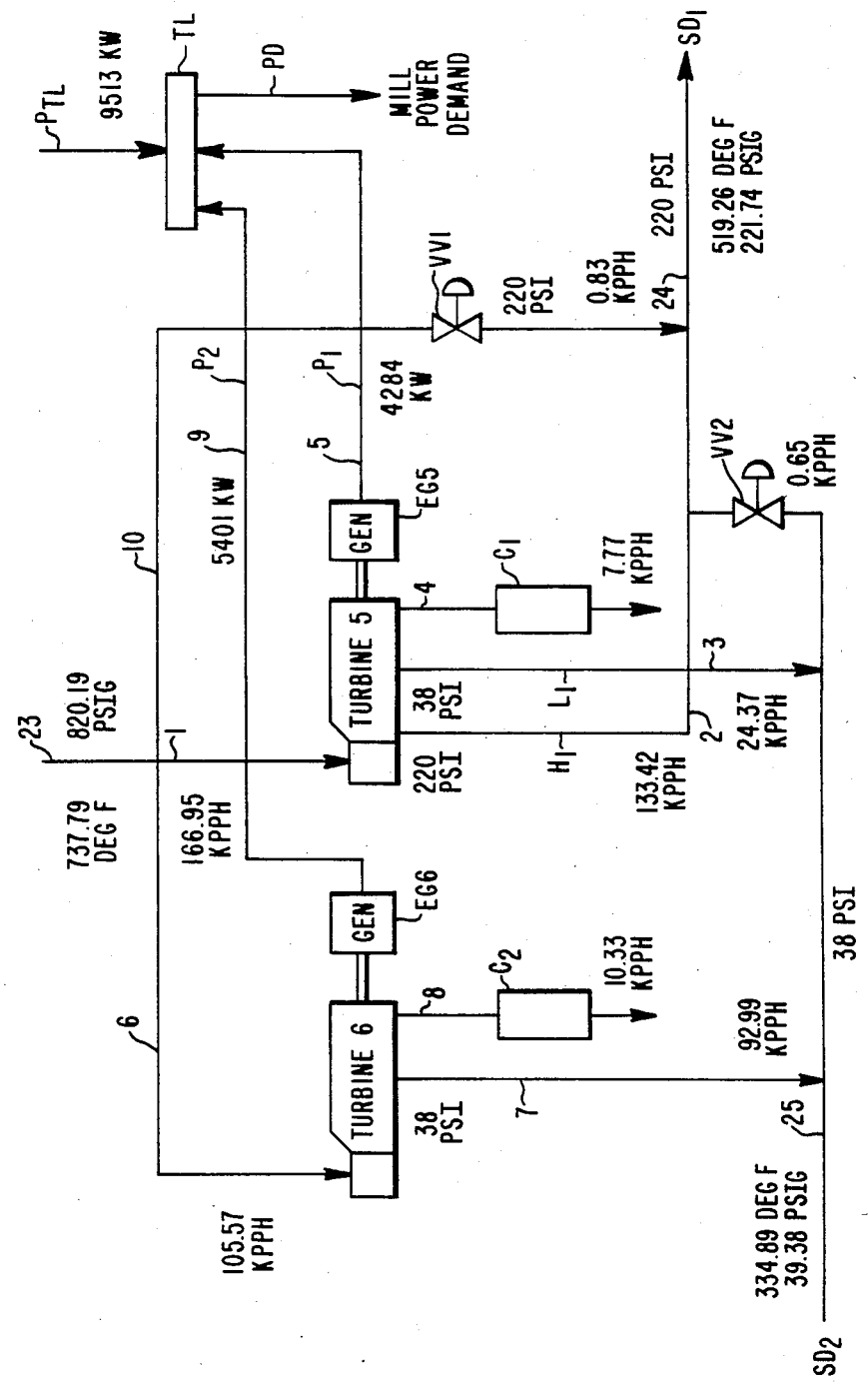
FIG. 5 is similar to FIG. 2 but simplified for the purpose of explaining the bypass means therein.

FIG. 5 is a two-turbine cogeneration plant like the one of FIG. 2, but simplified in order to illustrate the multiplane notion. In a first plane of control for optimization the two turbines TG5 and TG6 are in operation. Steam at, for instance, 820.19 psig and 737.79° F. at a given time is admitted by line 23 at the junction between pipe 1 leading to the inlet of turbine TG5, line 6 to the inlet of turbine TG6 and line 10 to pressure reducing valve VV1. Turbine TG5 has a high pressure extraction ($H_1$) line 2, a low pressure ($L_1$) extraction line 3 and an extraction line 4 to condenser C1. Turbine TG6 has a low pressure extraction C2. From the low pressure side of pressure reducing valve VV1 and from line 2 steam at 220 psi is collected and supplied on common line 24 to the industrial process. Steady at 38 psi is derived from lines 4 and 3, but also from a pressure reducing valve VV2 connected to lines 2 and 24. The 38 psi steam is supplied via a common line 25 to the industrial process. Turbines TG5 and TG6 are driving electro generators EG5, EG6, respectively, which produce megawatts P1 on line 5, P2 on line 9 to the line TL which receives complementary power $P_{TL}$ from the utility lines and supplies power demand PD to the industrial plant.

Considering control plane #1 which includes all the equipment just described, the demanded steam at the input on line 23 ($D_{IN}$) comes out as the process demand on lines 25 and 24 ($D_{OU} = SD_1 + SD_2$) with complementary energy in form of cogenerated power (P1+P2), and evacuated condensate (C1+C2). Steam demand on $SD_1$ and $SD_2$, combined with generated power P1 and P2 with steam to the condensers (C1 and C2) lead to optimization of the steam distribution on lines 1, 6 and 10 at the steam access, on lines 2, 3, 4, 7 and 8 for the extractions. Determining factors in allowing maximum capacity of a turbine for a given steam flow or for keeping the limits on the turbines and/or on the pressure lines, are the pressure reducing valves VV1, VV2.

Valves VV1, VV2 are between a higher pressure line (10 and 24, respectively) and a lower pressure line (24 and 25, respectively). Depending upon whether the valve is controlled from the lower pressure line or from the higher pressure line, it is a pressure-reducing valve or a let-down valve. Thus, a pressure reducing valve will take up a fall of pressure downward by an increase of the flow to supply more steam downward whereby the pressure will be increased, whereas a let-down valve will tend to absorb an increase of pressure manifested in the pipe upward, by leading the excess to a vent valve or a relief valve.

In this system, by order of cost the steam is classified
(1) the 850 psig 750° F. steam of line 23;
(2) the 220 psig 550° F. steam of line 24;
(3) the 38 psig 350° F. steam of lien 25.

The cost of electrical power, cogenerated depends upon how much of these steams are consumed, or recuperated in generating P1 and/or P2, which involves the evacuation to the condenser C1, or C2. The cost of P1, P2 is also related to the cost of complementary electricity from the tie-line $P_{TL}$. Considering valve VV1, when it operates as a pressure reducing valve, the amount of steam under conditions of flow and pressure from line 23 going into line 11 is regulated by reference to the conditions of flow and pressure in line 24. In other words, the steam is being bypassed into line 10 to the extent that valve VV1 is being controlled open. In so doing, the amount of steam used for cogeneration in producing P1 through expansion into turbine TG5 is modified, thus P1 is modified. At the same time, flows $H_1$ and $L_1$ in lines 2 and 5 are modified. It appears that control of VV1 will be dictated by the demand $SD_1$ of steam on line 24, for instance if such priority requires to sacrifice production of P1. VV1 will also be controlled if turbine TG5 has reached capacity and the excess of steam from line 23 should be diverted, in which case, VV1 will act as a let-down valve in order to relieve pressure on line 10. Similarly, pressure reducing valve VV2 may work in conjunction with VV1 to supply the demand SD2 from steam at higher pressure on line 23, without affecting the demand SD1 on line 24. VV2 may also increase the extraction $H_1$ from turbine TG5, thereby reducing the generation of power P1, or relieve the condenser C1.

It is observed that in the plane of control being considered at this time, optimization of steam and power distribution is dictated by the demands $SD_1$, $SD_2$, PD, P1, P2 and by the constraints: capacity of TG5 and TG6, limits of C1 and C2, pressure limits in lines 1, 6 and 10, limit of steam on lines 23, 24 and 25. Within those limits, the optimization method will find the solution, e.g. establish throttle position (TH$_1$, TH$_2$), extractions (H$_1$, H$_2$, L$_1$) and condensate flow (C$_1$, C$_2$), as well as the desired or acceptable values for the demand SD$_1$, SD$_2$, P$_1$, P$_2$. This may require valve positioning on VV1 and/or VV2.

The optimization, thus, requires initially to establish a matrix in which is stored the linear programming logic.

The matrix is established (actual or assumed) with the constants of the system in accordance with the status of the various equipment (automatic, manual, available, non-available). The target demands (SD, PD) are related to the calculated demand.

Then, according to the optimization method (linear programming or EVOP), mass flow determination takes place involving throttle position, extractions, determination on lines 1, 2, 3, 4 and 6, 7, 8 for maximization of utilization of steam in the generation of P1 and P2 on lines 5 and 9. In the process, the optimization model used leads to convergence toward a solution, which solution is, then, made actual by process control in accordance with the teachings of copending patent application Ser. No. 51,075, or otherwise. Having this established off-line, and made actual on-line as the best solution on account of costs, the method can be repeated to adjust to a new situation resulting from a modified demand in the identical process: at $SD_1$, $SD_2$, or PD, tripping of a turbine, or other change in the status of the equipment. For instance, turbine TG6 may have to be taken out of operation. This leads to a second plane of control including supply lines 1, 10, turbine TG5 producing power P1, extraction lines 2, 3, 4 and output demand lines 24, 25 behind lines 2 and 3, and valves VV1, VV2. In this control plane, optimization is effected, as before, with a matrix based on the reduced operating equipment, with corresponding constraints and limits, so as to reach an equilibrium in the cogeneration process. The same can be said if TG6 becomes the only operative turbine, thus without turbine TG5 being in use. This would be another control plane available for optimization.

In each plane, valves VV1, VV2 are initially adjusted before proceeding to optimization control.

The present invention provides for "switching" from one control plane to another control plane, thereby to initialize valves VV1, (VV2 in the example of FIG. 5) and have them quickly moved into a position ready to exercise flow optimization in the new control plane. The invention also provides for dynamic adjustments when the system has reached equilibrium, for instance a definite balanced steam flow between inputs and outputs. When one turbine trips, a different plane of control is defined which requires a different solution based on the new matrix. The result will be a new array of valve positions and steam flows. These are ascertained immediately so that they are available when needed. When the emergency occurs the valves are set, based on the new sets of values, to a new state without waiting. Control plane switching is establishing the pressure reducing valve positions which make possible to immediately optimize mass flow in the new plane.

By doing so, pressure, which has to rise in the line under the emergency, is immediately adjusted with a relief valve. Also, if a turbine is out of operation, condenser flow not being available anymore, this may require to vent steam. There may also be more steam than the remaining turbine can use. If throttle flow is at its limit there will be less extraction than needed. Having reached an equilibrium, it is possible that the pressure suddenly changes in a line ahead or below the established distribution of steam and power, for instance upward, or downward from a turbine. It is desirable to be able to restore the planned or established equilibrium without disturbing the same. To this effect, pressure reducing valves on a bypass of such zone in equilibrium are, according to the present invention, automatically controlled to absorb the excess of pressure, or to build up pressure and fill up a part thereof, thereby to promptly restore equilibrium. All this requires adjustments to the new situation in anticipation. These are performed in the control plane switching mode, as illustrated by a flow chart in FIG. 6 by reference to the system of FIG. 5.

Figure 6:
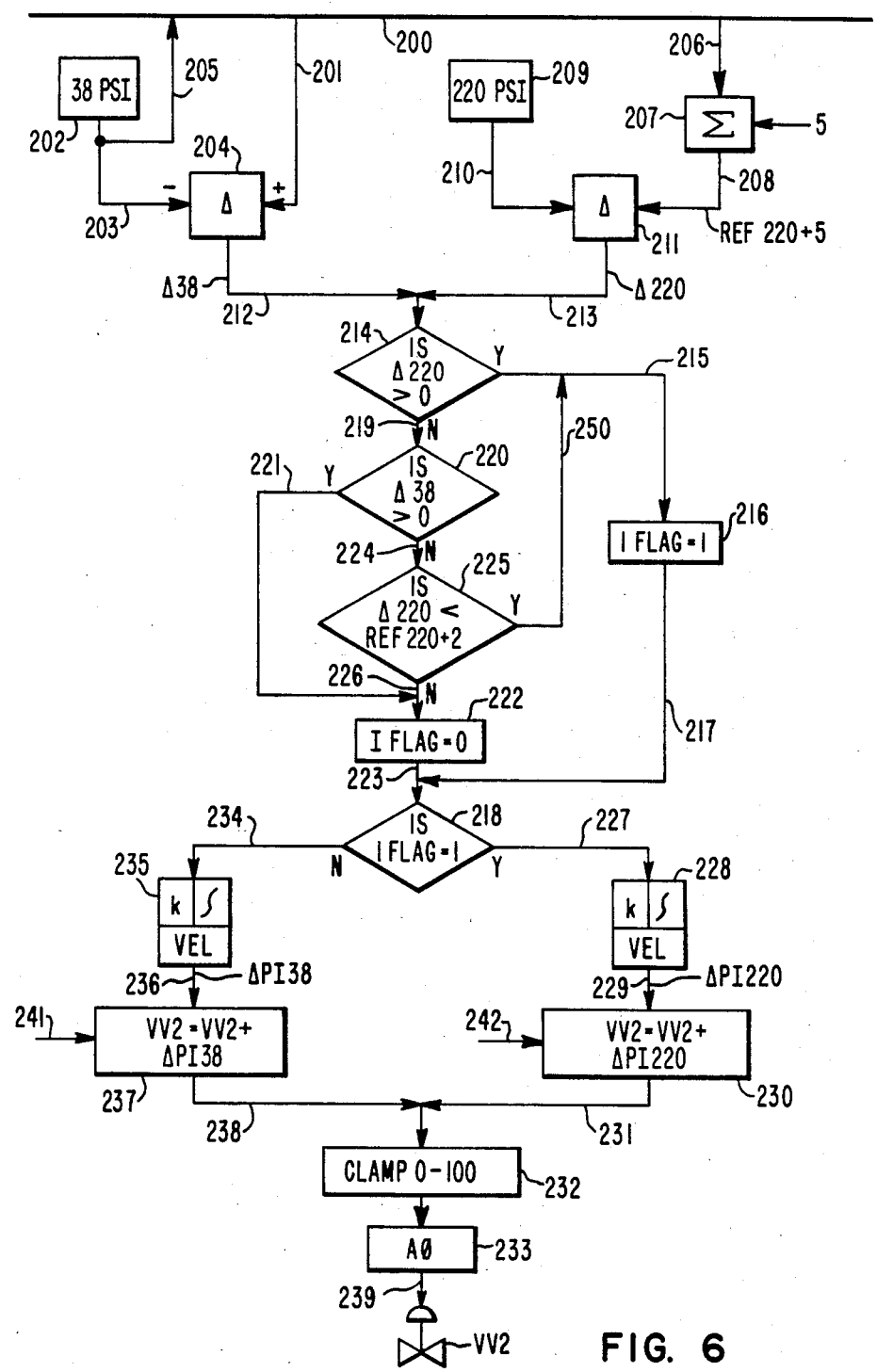
FIG. 6 is a flow chart illustrating transient change correction as applied with the bypass means of FIG. 6 to restore equilibrium in the control plane.

Referring for the purpose of illustration to FIG. 6 and pressure reducing valve VV2 of FIG. 5, control of valve VV2 will be shown in operation either as a let-down valve, or as a pressure reducing valve, depending upon from which side switching between two control planes is effected. Valve VV2 is operating between line 24 at 250 psi and line 25 at 38 psi. In FIG. 6 block 202 indicates that pressure at 38 psi downward from valve VV2 is being sensed, and the pressure signal so derived is applied via line 203 to a subtractor 204. The pressure signal is also sent via line 205 to a data highway 200 for parallel or supervisory control in the overall system. Subtractor 204 also receives on line 201 from the data highway a signal indicating the established pressure value in the equilibrium situation, thus, as required by the optimization solution. Similarly, for the 220 psig line 109, actual pressure is sensed at 209 and the pressure signal is applied via line 210 to a subtractor 211 responsive to a reference pressure derived on line 206 from the data highway. In order, however, to introduce a deadband in a control reaction to swaying upward of the pressure in line 109, at 207 a 5 psig value is added to the reference setpoint of line 206, whereby by line 208 is applied to subtractor 211 a setpoint of 220+5 psig.

Subtractors 204 and 211 detect an error ($\Delta 38$, $\Delta 220$, respectively) which is negative on line 212 from 204 and positive on line 213 from 211. This means that whenever the pressure sensed at 202 downward from valve VV2 is falling, valve VV2 must operate as a pressure reducing valve by opening to such an extent as to increase the flow and restore the pressure at the equilibrium level whereas, whenever the pressure sensed at 209 upward of valve VV2 is increasing, valve VV2 must operate as a let-down valve by opening to such an extent as to allow an increased flow therethrough leading to either a vent valve downward, or a relief valve upward, thereby to absorb by increased flow the excess of pressure in the 220 psig line.

When there is a negative error ($\Delta 38$) on line 212, the system goes to block 220 to test the sign of the error (is $\Delta 38 > 0$), then by 221 if the error is positive, by 224 and line 226 if the error is negative. The next step is at 222 to set the flag to zero (IFLAF=0), whereby, by line 223 this is ascertained at block 218 and by 234 steps for control of valve VV2 are taken to the left side of block 218. If, however, at 213 an error ($\Delta 220$) appears which is positive, at 214 this fact is ascertained (is $\Delta 220 > 0$) and, by 215, the flag is set to ONE (1FLAG=1) at 216. If the error at 211 is not positive, because the upper limit +5 of the demand is not reached, from block 214 by lines 219 and 224 the test becomes at 225 whether the pressure signal ($\Delta 220$) of line 210 is larger than the reference 220+2 psig in which case the flag is again set to ONE, via lines 250 and 215, at 216. Otherwise, by line 226 the flag is set to zero at 222. When the flag is set at ONE, by line 217, this leads to the question of block 218 whether it is so and a YES on line 227. Control of valve VV2, in the situation is via the right side branch from block 218. The bias of 5 psig on line 208 and the bias of 2 psig on line 250, determine on line 215 a YES with a deadband of 5−2=3, e.g. control is initiated when the pressure signal of line 210 exceeds 220+5, and control does not cease until the pressure signal of line 210 falls below 220+2. In the latter case, a NO at 225 leads by line 226 to 227 where the flag is set to zero and at 218 the answer is N, thus no control is effected on the right side of block 218. Control by line 227 goes to a proportional-integral control loop 228 which provides on line 229 a change of rate ΔPI 220 in the position of the valve member. In register 230 of the valve this is performed by adding to the present position on line 242 the change ΔPI 220 from line 229. The command signal of line 231 goes to a clamp at 232 which specifies the extreme portions allowable for valve VV2.

Similarly, if there is a negative error on line 212, by 234 the error is applied as input to a proportional, integral control loop 235 which operates on the velocity, or rate of change in position of the valve member. The control signal ΔPI 38 is developed on line 236 which is a positive command for a change of position to be added at 237 to the present position of the valve received at 241, thereby opening the valve more to the extent of the error and effecting a pressure reducing valve correction for the fall of pressure sensed at 202. Again, the signal of line 238 goes to a clamp at 232 which spells out the extreme positions allowable for the valve. At 233 the command signal from 232 is converted into an analog output applied to the positioner of valve VV2 which actually positions the member of the valve.

The overall system operation will now be considered by reference to FIGS. 7A–7D, which illustrates the operation with three discontinuous planes and with two pressure reducing valves operated within such discontinuous planes.

Figure 7A:
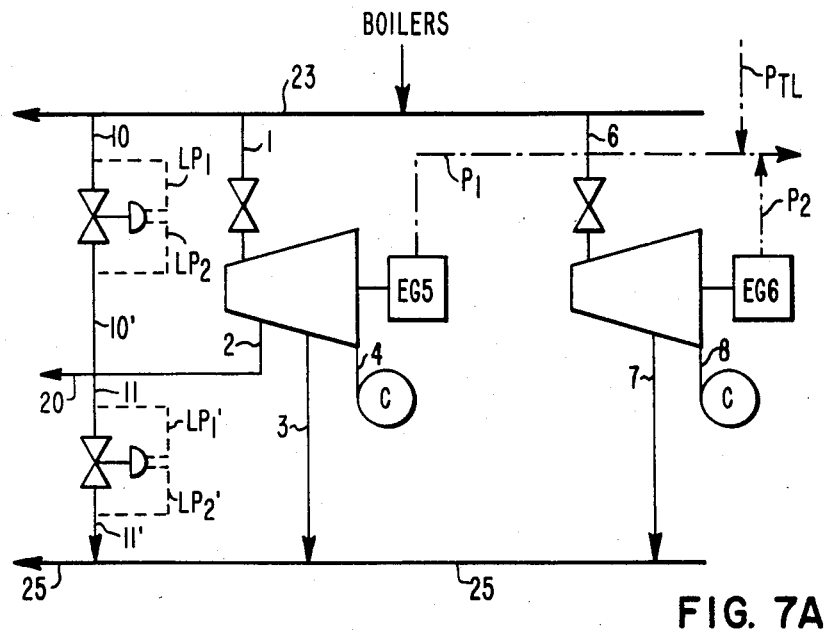
FIGS. 7A, 7B, 7C illustrate in the light of FIG. 2 system status and configuration for three discontinuous planes of control, respectively.
Figure 7B:
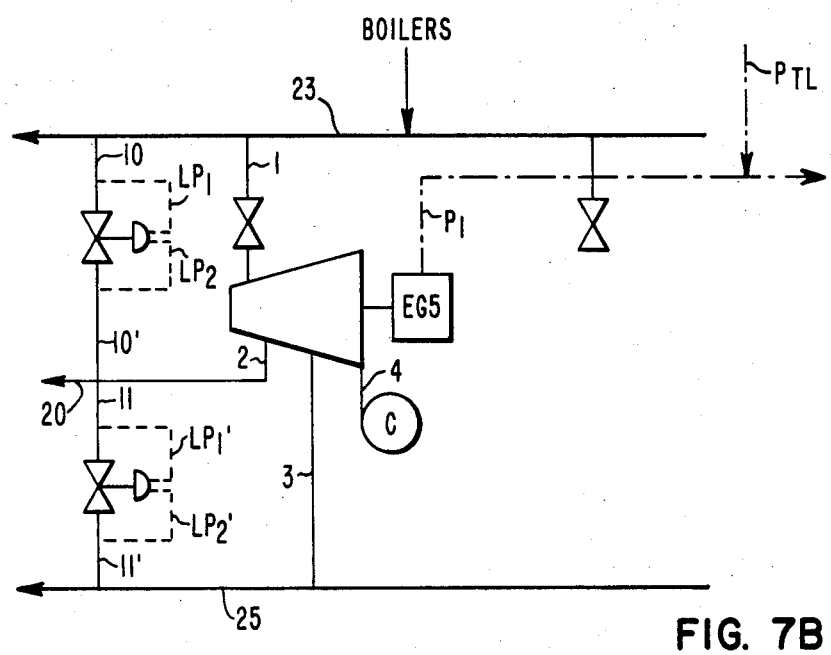
Figure 7C:
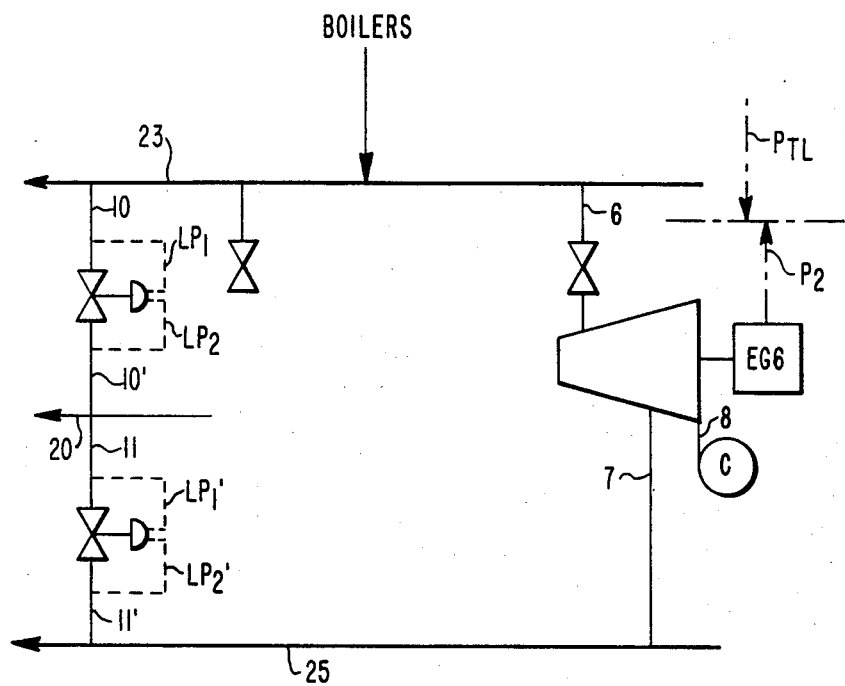

FIGS. 7A, 7B and 7C show the three discontinuous planes. Plane #1 includes the two turbines TG5 and TG6 of FIG. 2 producing power $P_1$, $P_2$ which add up to the tie-line power $P_{TL}$ to meet a power demand PD. The two turbines generate steam flow distribution on line 23 at 850 psi, line 20 at 220 psi and on line 25 at 38 psi thereby to meet a steam demand SD. Mass balance and flow equality are met throughout the pipe lines which include flow to the condensers of the turbines, namely from lines 4 and 8. Pressure reducing valves VV1 between lines 23 and 20, and VV2 between lines 20 and 25 are controlled to meet flow and pressure requirements. Such pressure reducing valve can be controlled in an emergency to meet an overpressure (line 10 and control loop LP1 for VV1, line 11 and control loop LP1' for VV2) on the high pressure side, or a loss of pressure (line 10' and control loop LP2 for VV1, line 11' and control loop LP2' for VV2) on the low pressure side thereof.

FIG. 7B is similar to FIG. 7A, but differs in that turbine TG6 is not in use, whereas FIG. 7C is also similar to FIG. 7A, but differs in that turbine TG5 is not in use. These are the two discontinuous planes plane #1, plane #2 and plane #3 considered hereinafter in FIG. 7D.

Figure 7D:
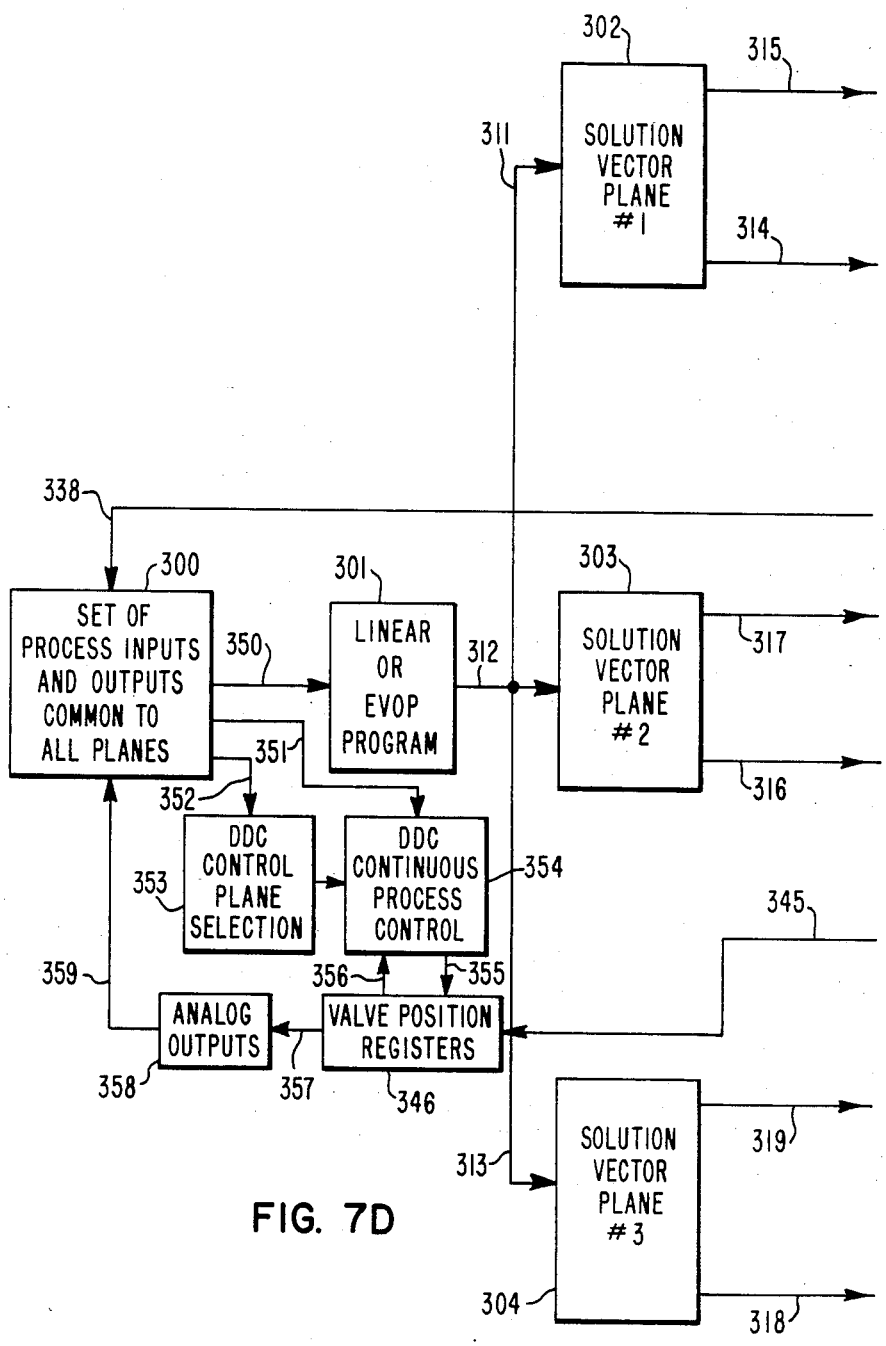
FIGS. 7D and 7E are a schematic representation of the system according to the invention. It is illustrated in the context of the invention illustrated in relation to FIGS. 7A, 7B and 7C with plane monitoring and identification, concurrent with optimization determination and subsequent implementation of control of power and flow distribution, including pressure adjustment.

Referring to FIG. 7D, on lines IP are derived signals characterizing: valve positions in accordance with a plane in operation, flow in the respective fluid lines, power in the respective electrical lines, pressures at the respective points, as measured in the system of FIG. 2. These signals are inputted into the system of FIG. 7D by lines IP and distributed by block 300. These operative data are passed to two different positions of the system of FIG. 7D. By line 350 they are provided for use in the optimization of linear programming, or in the EVOP program within block 301. By line 351 they are provided for direct digital control for continuous positioning of valves VV1 and VV2 in accordance with the selected continuous plane which selection is effected within block 353, in accordance the relevant data from lines IP derived on line 352 from block 300 which define plane selection by the current pipe network status and configuration.

In accordance with such direct digital control, valve position is determined and stored into the valve position register at 346. As a result of such established valve position within the attending valve register, analog outputs are derived by block 358 in response to line 357 and corresponding analog command signals are sent by line 359 to the distributor, or buffer block 300 which sends via lines OP output commands to valves VV1, VV2, together with the commands for the other valves such as governor, throttle, extraction and flow condenser valves related to the systems of FIG. 2 and FIG. 7A, 7B or 7C.

Figure 7E:
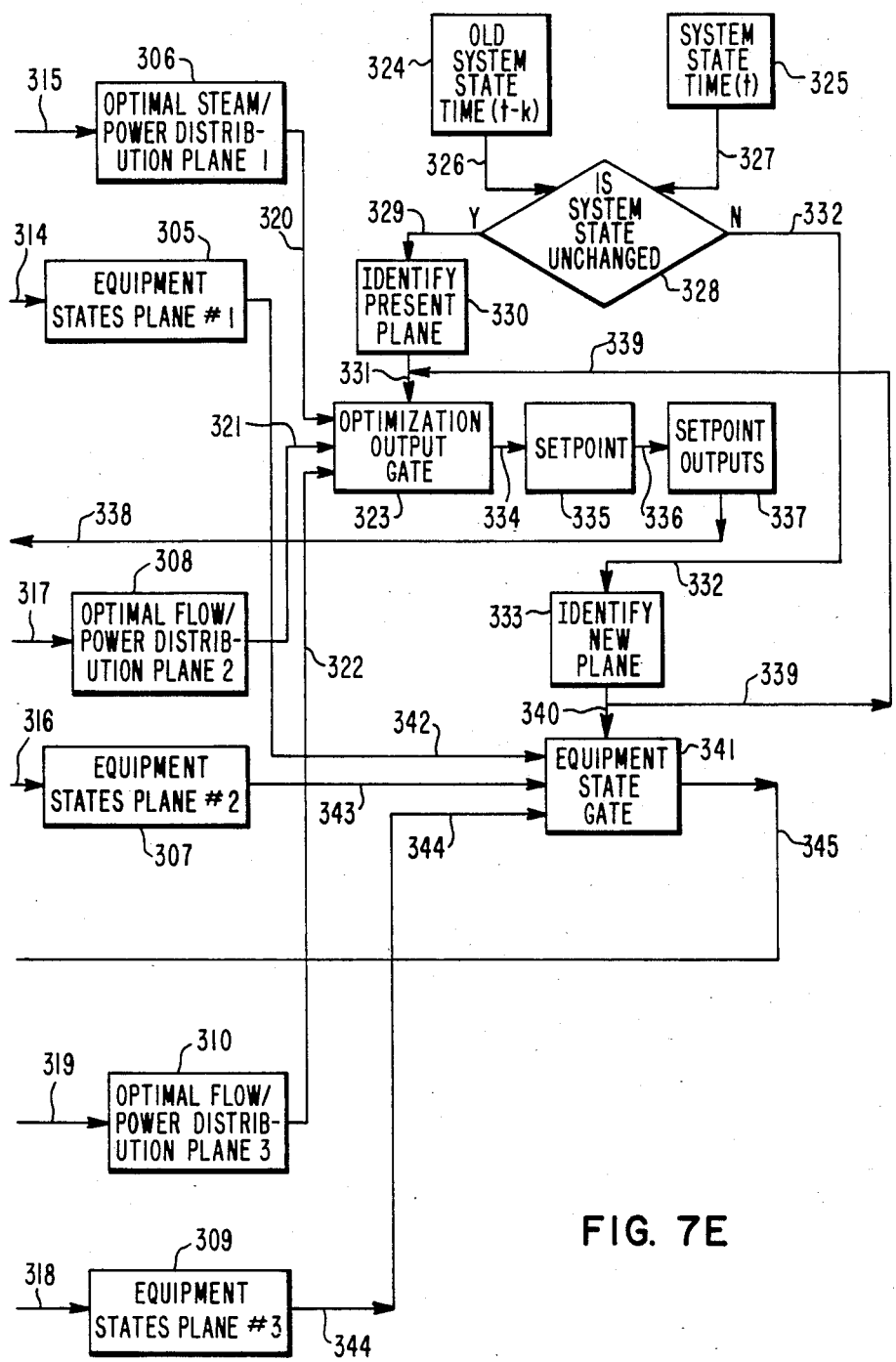

Operation in the discontinuous plane will be further explained by reference to FIG. 7D and FIG. 7E, as follows:

It is assumed that in the system of FIG. 7B for plane #2, the amount of steam coming from the boilers is uncontrolled. Normally, all of the 220# steam of line 20 will be provided by the extraction line 2 from TG5, as will all of the 38# steam of line 25 from line 3. However, if the 220# extraction flow reaches the maximum allowed from TG5, then VV1 will open slightly under the influence of the reducing valve control plane LP2 to make up the difference. Imbalances between process steam demand and the total amount of steam available, are resolved by varying the amount of steam sent to the condenser.

Supposing now that the amount of 850# steam of line 23 consumed by auxiliaries or the process is reduced, or that the amount of 850# steam coming from the waste heat boilers increases. The pressure in the 850# header (line 10) immediately rises until it reaches the threshold where the value IFLAG becomes unity (216, 217, 218 in FIG. 6). Because the pressure is high, the inlet pressure controller associated with the turbine will also respond, but the response rate of the turbine is much slower than that of a valve system. The valve control now switches to the let-down plane LP1 and valve VV1 opens beyond its initial position in an attempt to lower the pressure in the 850# header. This causes the pressure in the 220# header (line 10') to rise and the 220# extraction governor now responds, causing the surplus steam to pass to the condenser (line 4), the pressure in the 220# header (line 20) being maintained at its normal value.

The 850# header pressure is still high since IFLAG is still unity (at 216 in FIG. 6), but the turbine throttle flow has been increasing under the influence of the inlet pressure governor, this increased flow also passing to the condenser. Slowly the pressure in the 850# header falls to the point where IFLAG=0 (at 222 in FIG. 6). Valve VV1 now reverts to the reducing valve control plane LP2; but the setting of the PRV control loop will be slightly lower than the setting for the 220# extraction governor. Valve VV1 will therefore tend to close, causing the 220# extraction governor to respond and divert some steam from the condenser to the 220# extraction port. This interaction will continue until either valve VV1 is fully closed and the control of pressure is only under the influence of the extraction governor; or until the extraction flow reaches its maximum, on which occurrence VV1 will have to open slightly once more in order to hold the header pressure. In either case, the pressure in the 850# header has been safeguarded during the transient while the 220# header pressure has also been continuously under proper control.

It is assumed that in the system of FIG. 8B for plane #2, the amount of steam coming from the boilers is uncontrolled. Normally, all of the 220# steam of line 20 will be provided by the extraction of line 2 from TG5 as will all of the 38# steam of line 25 from line 3. However, if the 220# extraction flow reaches the maximum allowed from TG5, then VV1 will open slightly under the influence of the reducing valve control plane LP2 to make up the difference. Imbalances between process steam demand and the total amount of steam available, are resolved by varying the amount of steam sent to the condenser.

As it appears, since the strategy to change valve position in response to a sudden flow input change has been according to the present invention predetermined, the proper valve response is anticipated in advance of such event and by forcing the desired change before the pressure in the 850# header has risen to the threshold where the control plane becomes switched the critical situation is avoided.

In this respect, referring for the sake of illustration to Case #1 of the Appendix which corresponds to FIG. 7A and plane #1, block 302 provides as a result of the optimization process in block 301 all the data of columns 1 to 9 in the table of the appendix. From these by line 315, block 306 gathers the settings which correspond to columns 3 and 5 and 7 and 9 as well as column 12 of the table of the appendix, thereby, determining the optimal power and steam distribution about the turbines TG5, TG6.

Concurrently, by line 314 in block 305 the valve positions which match such optimization in plane #1 are extracted out from block 302 and stored into block 305. These are the solution data of columns 10 and 11 in the table of the appendix converted to equivalent value position (for instance). Such valve positioning is carried by line 342 and passed through selector gate 341, then, by line 345 applied to the registers of valves VV1, VV2 in block 346. It is observed, that while optimization establishes the setpoints for optimal steam flow and *power* distribution, storing then in block 302, the pressure reducing valves which control pressure are immediately set *to a position* which substantially matches the steam/power new distribution for plane #1 when switching to that plane. As a result, the transitory changes of pressure which would be caused by the flow adjustments are concurrently eliminated by such early pressure reducing valve adjustments.

Fine tuning can, then, be performed within the new plane in accordance with FIG. 6 as represented by blocks 353 and 354 in FIG. 8D, for the sake of clarity. The new plane (plane #1 in the last illustration) is selected at 353 in accordance with the data of line 352. The control process is conducted in block 354—as explained with more details by reference to FIG. 6, and the registers of block 346 for valves VV1 and VV2 are loaded (about the initial new position established from line 345) with the corrective percentage of adjustment required for subsequent fine tuning by line 355. It appears that block 346 corresponds to blocks 230 and 237 of FIG. 6 associated with the particular valve (VV1 or VV2). One is indicated there for purpose of illustration. Moreover, blocks 235 and 228 are found within block 354 of FIG. 7D, line 236 and 229 of FIG. 6 are shown by line 355 in FIG. 7D. Line 239 which leads to the positioner of the particular valve in FIG. 6 corresponds to line 357 of FIG. 7D. It is going to analog output block 358 and lines 359 and OP (through distributor 300) which lead to the system.

From a comparison between FIG. 7D and FIG. 6 it also appears that block 353 of FIG. 7D corresponds to the portion of FIG. 6 including blocks 202 and 209, 204 and 211 all the way down to line 223 and question block 219 relative to the IFLAG status. Then, block 354 of FIG. 7D corresponds to block 218 of FIG. 6 down to the control line 239.

Referring again to the discontinuous planes, it is observed here that before any system status such as FIGS. 7A, 7B or 7C has been ascertained as the operative one, the three planes are already known as a possibility. Accordingly, ahead of any plane "switching", the optimization process (by a linear programming or by the EVOP method) can already be performed in block 301 and for the various planes. In each instance (block 302 for plane #1, block 303 for plane #2 and block 304 for plane #3) the computed optimal solution is stored, thus establishing setpoints which determine for the turbine's throttle and extractions. Also, for each of the three situations, by lines 315, 317 or 319 the optimal flow and power distribution for plane #1 in block 306, for plane #2 in block 308 and in block 310 for plane #3 all established. At the same time, by line 314 from block 302, by line 316 from block 303 and by line 318 from block 309 the equipment status for planes #1, #2 and #3 respectively are ascertained having prepared through block 301 and kept within blocks 302, 303, 304 at all times the results for each plane, which are refreshed recurrently in order to take into account changes in power demand and steam demand as are current at the inputs and the outputs of the system of FIG. 2, it remains to choose at 330 and 353 the actual plane after monitoring status and configuration at 328, which is the plane of control with which control will be performed at 335 and carried out by lines 338 to distributor or buffer 300, and by line 345 to register 345 of the valve position registers 346. If monitoring at 324 and at time (t−k) indicates one particular plane (#1, #2 or #3), at time (t) monitoring shows at 325 another state which may require at 330 to identify another plane. Thus alternatively, plane "switching" is defined between line 326 from block 324 and line 327 from block 325. Then, at 328 it is determined whether the system is unchanged (line 329 or not line 332). If YES on line 329 from block 328, at 330 the present plane is identified. If NO on line 332 from block 328, at 333 the new plane is identified. Depending upon which plane is the present plane at 330, by line 331 a selector 323 gates the desired output from line 320, 321 or 322 from 306, 308 or 310 relative to the plane in question. The gated optimal results appear on line 34 which are used by the control program 335 (see copending patent application Ser. No. 548,478) which establishes the setpoints. Then, the output commands are generated within block 337 carried over by distributor 300, and thereafter as OP to the system. At the same time from line 342, 343 or 344, the position to be assigned to pressure reducing valve VV1 and/or VV2 according to the operative plane is derived from block 305, 507 or 309 and gated by 341 onto line 345 and the corresponding valve register within 346.

If, however, it appears at 328 that the system has changed plane, as shown by line 332, this plane is identified at 333. The gate 341 is controlled by line 340 to pass the corresponding one of lines 342, 343 and 344 onto line 345, whereas via line 339, gate 323 is controlled to pass the corresponding one of lines 320, 321 and 322 onto line 334. As illustrated in FIG. 2, the system of FIG. 6, and FIG. 7D is part of the computer system C.M.P. Plane monitoring of FIG. 7D is carried upon detection of a change of status and configuration at 328 from lines 326, 327 and the new discontinuous plane of control is recognized by the computer system in response to lines 329, 332.

Referring again to FIG. 2, there is shown there associated with the computer system used to implement the optimization method according to the present invention, a demand controller TLC to implement demand control according to U.S. Pat. No. 3,872,286 of R. E. Putman issued Mar. 18, 1975. For the purpose of this application, the Putman patent is hereby incorporated by reference. The demand controller TLC is responsive on line 56 to commands from the computer system block CMP to derive on line 57 an excess demand $\Delta P$ requiring that specific electric loads in the plant be shed, so as to maintain the total electric demand below an assigned limit DL, as explained in the patent. Interruptible loads in the plane represent a definite amount of power consumed under specific switching constraints. The demand control system takes into account priorities established between such loads, when determining whether a load, by line 98, should be switched ON, or shed, in order to maximize production while keeping the consumption under an assigned limit during each billing period. In the context of the present optimization method for cogeneration, the amount of power cogenerated is material to the extent that the power demanded from the tie-line $P_{TL}$ is within or would exceed the requirements for demand control.

Should demand PD be seen to be excessive from predictions made during a 15-minute period, the power P1 on turbine TG5 would be increased above the previously calculated minimum up to the limit of load. Subsequently the load or turbine TG6 would be increased, should turbine TG5 not be able to sustain the required additional load.

A demand control program is provided, the output of which is superimposed as a subprogram on the minimum condenser flow solution of the optimization program by means of an integrator.

When an optimal solution has been found, the system goes to the demand control program operation. Demand control is effected as explained in U.S. Pat. No. 3,872,286 of R. E. Putman, during successive demand periods of say 15 minutes, to see whether the demand is targeted above or below the demand limit DL, calculate the error, exercise a deadband for no control, introduce a bias and decide to select interruptible loads to be shed according to a priority order and weights. The demand period is initiated by a pulse from the demand meter of the utility company. The demand period is typically divided into three elementary periods. The "first period" is a no-control zone which lasts, typically four minutes. The "second period" is a period in which the demand limit includes a fixed bias, and in which the deadband is exercised. It is a zone of control which lasts typically seven minutes, that is, eleven minutes from the fifteen minutes total. The "third period" is the remaining time in the demand period, during which the bias is adjusted down to zero at the end of the demand period.

As explained in copending patent application Ser. No. 550,164 filed Nov. 8, 1983, demand control is performed when required by the program. Then, it is determined whether the time period is less than four minutes ("first period"). If it is NO, the time remaining in the demand period is calculated. The projected error is calculated at the end of the period. The deadband is exercised if there is a negative error which is smaller than the deadband. Otherwise, the time into the demand period is found to be less or more than eleven minutes ("second period" or not). In the "second period" the system exercises the fixed bias by adding it to the error and the deadband is exercised. After the "second period" has lapsed, the adjustable bias is varied down to zero, and the error is added to the bias.

When demand control is not to be exercised, the system enforces the requirement to optimize control of the turbogenerator units by minimizing condenser losses. If demand control is to be exercised, a load change is required equal to the error, either interruptible loads will be shed according to the priority schedule as explained in the Putman U.S. Pat. No. 3,872,286, thereby not to exceed the demand limit DL, or the turbogenerator units will be used in order to shift power consumed from the tie-line to the cogeneration group. In the latter instance, the system ascertains whether the load change is less than the maximum allowable change.

An integrator function is introduced based on the assumption that through condenser generation 12 is possible to absorb the change. The system then responds both to a demand control change or to an optimization control change.

It is identified and indexed as LL, which turbine operates with the lower steam rate, that is, the one for which is it cheaper to consume steam in generating power. Then, the other turbine is identified and indexed as MM, namely the one for which the steam rate is higher. It is first determined what the cost of generated power will be. Then, this amount is compared to buying the same amount of power from the tie-line. If it is no more expensive to cogenerate electrical power, that amount of power is produced in order to reduce the tie-line power $P_{TL}$ and reach the minimum needed.

The maximum increase on LL is the lowest between the reserve power, the reserve turbogenerator the maximum allowable change and the desired change. Having determined the change of power to be derived from the low rate turbine LL, it becomes known that the change to be made on the other turbine MM is the difference between the total change and the change on turbine LL. Finally, the system goes to the turbine control program, which is explained in copending patent application Ser. No. 548,478, now U.S. Pat. No. 4,577,280.

The differences between actual and desired power generated in the above programs will be converted to a time duration of contact closure and control so implemented. Header pressures need to be monitored in order to avoid adjusting extraction setpoints outside the operating range. The system is designed to function even with one machine out of service. A clock is included for calculating time into the demand period and the period of this clock is reset automatically by the demand period pulse, as explained in the Putman patent. The following analog inputs are provided: throttle flow (one for each); high pressure extraction flow (one for each); low pressure extraction flow (one for each); condenser flow (one for each); the two turbine powers P1, P2; flow through pressure reducing valve VV1; header pressure (header HD #1) and tie-line power $P_{TL}$. The digital inputs are: the tie-line KWH meter pulse input and the demand period pulse input. The digital outputs consist of six contact points. When implementing control for optimization according to copending application Ser. No. 550,164 filed Nov. 8, 1983, or according to this application and concurrently effecting demand control (the latter according to U.S. Pat. No. 3,872,286 of R. E. Putman), a problem of stability arises in cogeneration systems of the type here described.

Power is generated by passing high pressure steam through turbogenerators to produce both power and process steam, pressure reducing valves are commonly included in the system. One of the pressure reducing valves' functions is to satisfy an imbalance between total steam demand, and the steam flow through, and power from, the turbogenerators. For system stability these reducing valves normally possess a drooping characteristic, whereby a change in steam flow can only be produced by a change in process steam header pressure. As a result, when control requires changing steam flow distribution and adjusting the turbine extraction valves, interactions will occur which will delay reaching a new equilibrium.

In order to overcome this the technique of copending patent application Ser. No. 548,478, now U.S. Pat. No. 4,577,280 is used. This technique consists in anticipating steam flow distribution changes upon a given intended valve governor adjustment, such anticipation being taken into account when adjusting the turbine speed and extraction valve governors. A program used for such anticipation resolves these interactions for a given set of desired changes to steam flow and power. As earlier stated, the program converts the corresponding changes in turbine governor and extraction valve settings to equivalent contact closure durations which are, then, implemented.

Power generated by the turbogenerators ($\Delta P1$, $\Delta P2$) may be the only variable controlled at times. At other times only steam flow changes are required ($\Delta EX1$, $\Delta EX2$). When both types of changes in the pressure settings are required, a practical problem arises caused by the interaction between the control actuations through the process. When an optimum steam flow/power distribution has been determined by the EVOP system and is to be implemented, changing the setting of only one device at a time in a sequence requires numerous executions of the sequence before the new distribution is finally achieved for all flows. A method has been disclosed in copending patent application Ser. No. 540,478 for resolving the inherent interactions between equipment i.e. "decoupling" them, prior to making any changes. The devices are then all adjusted simultaneously by the calculated amounts so that the desired set of net changes to the distribution is achieved in just one pass. By incorporating a dead band into the control strategy, the likelihood of this objective being achieved is increased (since the accuracy within which optimum settings are made does not need to be absolutely precise).

An associated advantage of this strategy which incorporates a dead band is that by minimizing the frequency of making changes to equipment settings, the life of the regulating devices is increased and maintenance reduced. The decoupling concept of control has been disclosed, in another industrial process context, in U.S. Pat. No. 4,500,950.

Demand control is performed in response to power demand $P_{TL}$ from the turbine and a demand limit DL assigned to the plant, e.g. a limit in KWH (or KVAH) not to be exceeded within the demand period, for instance, 15 minutes, provided by the wattmeter of the utility company. As a result, computation is performed within block DC in accordance with the teachings of the aforementioned U.S. Patent of R. E. Putman. The decision taken may be to change P1 and control turbogenerator TG5 or to change P2 and control turbogenerator TG6, or both. Assuming such a control, the set point setting for the electrical generation by turbogenerator TG5 or by turbogenerator TG6, or for both, will be modified to a new count. Accordingly, as explained in copending patent application Ser. No. 550,164 filed Nov. 8, 1983, a signal representative of the error will be carried in accordance with the conrol signals derived from the optimization control circuit for a change in power P1, for TG5 and/or a change in power P2, for TG6. The optimization circuit is responsive to signals indicative of the power demand $PD = P1 + P2 + P_{TL}$ and to a signal indicative of the steam demand SD in the plant. According to the explanations heretofore given relative to the optimization technique between steam and electrical power, a change in power P1 is prescribed and a change in power P2 is prescribed. The circuit also requires definite changes for optimization of steam flow in accordance with generated signals.

The turbogenerator control task consits of a main program which is called:
(a) at least every 20 seconds; or
(b) at the completion of an on-line optimization activity; or
(c) at the completion of an execution of the demand control program which requests a change in the amount of power being generated.

Associated with the main program is an independent contact output control task (Program CCOCON) which is bid automatically every one-tenth of a second and runs at a high priority level.

The relative task levels of this group of programs, starting with the highest, are:

| | |
|---|---|
| (i) Contact closure control program | (every 1/10 sec.) |
| (ii) Demand control program | (every 5 secs.) |
| Turbogenerator control program | (at least every 20 secs.) |
| (iii) Optimization program | (at least every 5 mins.) |

The demand and turbogenerator control programs are run both at the same level taking advantage of their short execution time.

The basic data passed to the control program are grouped in an array containing the Current actual values of generator powers P1, P2, and the reducing valve (PVR1, PVR2) flows, and in a target array containing the optimal values of the same powers and flows and if required also the demand control power values. The set of simultaneous equations in which flow and power differences are embodied are treated numerically as explained in copending patent application Ser. No. 550,164.

APPENDIX A

Linear Programming Optimization With The Fluid Distribution System OF FIG. 2

Four cases for illustration:
Case #1 is the most general and basic case with both machines on full AUTO.

Case #2 involves changes from Case #1 by which constraints of lines 6, 7, 8, 16, 17 and 18 in case #1 have been modified. TG5 is on AUTO whereas TG6 is on manual.

Case #3 like in case #2 involves lines 1, 3, 4, 5, 19, 20, 21 and 23 of case #1. Here TG5 is on manual, while TG6 is on AUTO.

Case #4 involves a change of plane of control by deliberately shutting down turbine TG6 and changing the constraints of lines 6, 8, 12, 16, 17 and 18 in case #1. In addition, the total demands have been changed in order to accommodate the total demand to a single machine.

These four cases are summarized by the following Tables #1, #2, #3 and #4, respectively. Table #5 summarizes for the four cases the results of the optimizations and the amounts of savings.

TABLE #1

| | TG #5 | | | | | TG #6 | | | | VV1 850/ 220 | VV2 220/ 38 | TIE LINE | |
|---|---|---|---|---|---|---|---|---|---|---|---|---|---|
| | $T_1$ 1 | $H_1$ 2 | $L_1$ 3 | $C_1$ 4 | $P_1$ 5 | $T_2$ 6 | $L_2$ 7 | $C_2$ 8 | $P_2$ 9 | 10 | 11 | $P_{TL}$ 12 | |
| 1 | 1 | | | | | | | | | | | | $\leq 240000$ |
| 2 | | | 1 | 1 | | | | | | | | | $\leq 140000$ |
| 3 | | | 1 | | | | | | | | | | $\leq 150000$ |
| 4 | | | | | | | | | | | | 1 | $\leq 6000$ |
| 5 | | | | | 1 | | | | | | | | $\leq 9500$ |
| 6 | | | | | | 1 | | | | | | | $\leq 135000$ |
| 7 | | | | | | | 1 | | | | | | $\leq 130000$ |
| 8 | | | | | | | | | 1 | | | | $\leq 9500$ |
| 9 | 1 | $-1$ | $-1$ | $-1$ | | | | | | | | | $= 0$ |
| 10 | | | | | 1 | $-1$ | $-1$ | | | | | | $= 0$ |
| 11 | 1 | $-.75$ | $-.5$ | | $-8$ | | | | | | | | $= 12000$ |
| 12 | | | | | | 1 | $-5$ | | $-8.57$ | | | | $= 12400$ |
| 13 | | 1 | | | | | | | | 1.124 | $-1$ | | $= 169820$ |
| 14 | | | 1 | | | | 1 | | | | 1 | | $= 126850$ |
| 15 | | | | | 1 | | | | 1 | | | 1 | $= 18519$ |
| 16 | | | | | | | | | 1 | | | | $\geq 3000$ |
| 17 | | | | | | | | 1 | | | | | $\geq 10000$ |
| 18 | | | | | | | 1 | | | | | | $\geq 0$ |
| 19 | | | | | 1 | | | | | | | | $\geq 2000$ |
| 20 | | | | 1 | | | | | | | | | $\geq 10000$ |
| 21 | 1 | 1 | | | | | | | | | | 1 | $\geq 0$ |
| 22 | | | | | | | | | | | | 1 | $\geq 2000$ |
| 23 | | 1 | | | | | | | | | | | $\geq 0$ |
| | COST | | .006727 | | | | .006727 | | | .006727 | | .0435 | |

CASE 1
BOTH MACHINES ON FULL AUTO

TABLE #2

| | TG #5 | | | | | TG #6 | | | | VV1 850/ 220 | VV2 220/ 38 | TIE LINE | |
|---|---|---|---|---|---|---|---|---|---|---|---|---|---|
| | $T_1$ 1 | $H_1$ 2 | $L_1$ 3 | $C_1$ 4 | $P_1$ 5 | $T_2$ 6 | $L_2$ 7 | $C_2$ 8 | $P_2$ 9 | 10 | 11 | $P_{TL}$ 12 | |
| 1 | 1 | | | | | | | | | | | | $\leq 240000$ |
| 2 | | | 1 | 1 | | | | | | | | | $\leq 140000$ |
| 3 | | | 1 | | | | | | | | | | $\leq 150000$ |
| 4 | | | | | | | | | | | | 1 | $\leq 6000$ |
| 5 | | | | | 1 | | | | | | | | $\leq 9500$ |
| 6 | | | | | | 1 | | | | | | | $\leq 78670$ |
| 7 | | | | | | | 1 | | | | | | $\leq 66670$ |
| 8 | | | — | | | | | | 1 | | | | $\leq 3844$ |
| 9 | 1 | $-1$ | $-1$ | $-1$ | | | | | | | | | $= 0$ |
| 10 | | | | | 1 | $-1$ | $-1$ | | | | | | $= 0$ |
| 11 | 1 | $-.75$ | $-.5$ | | $-8$ | | | | | | | | $= 12000$ |
| 12 | | | | | | 1 | $-5$ | | $-8.57$ | | | | $= 12400$ |
| 13 | | 1 | | | | | | | | 1.124 | $-1$ | | $= 169820$ |
| 14 | | | 1 | | | | 1 | | | | 1 | | $= 126850$ |
| 15 | | | | | 1 | | | | 1 | | | 1 | $= 18519$ |
| 16 | | | | | | | | | 1 | | | | $\geq 3843$ |
| 17 | | | | | | | | 1 | | | | | $\geq 12000$ |
| 18 | | | | | | | 1 | | | | | | $\geq 66669$ |
| 19 | | | | | 1 | | | | | | | | $\geq 2000$ |
| 20 | | | | 1 | | | | | | | | | $\geq 10000$ |
| 21 | 1 | 1 | | | | | | | | | | 1 | $\geq 0$ |
| 22 | | | | | | | | | | | | 1 | $\geq 2000$ |
| 23 | | 1 | | | | | | | | | | | $\geq 0$ |
| | COST | | .00672 | | | | .006727 | | | .006727 | | .0435 | |

CASE 2
TG #5 ON AUTO, TG #6 ON MANUAL

TABLE #3

| | TG #5 | | | | TG #6 | | | | VV1 850/220 | VV2 220/38 | TIE LINE |
|---|---|---|---|---|---|---|---|---|---|---|---|
| | $T_1$ 1 | $H_1$ 2 | $L_1$ 3 | $C_1$ 4 | $P_1$ 5 | $T_2$ 6 | $L_2$ 7 | $C_2$ 8 | $P_2$ 9 | 10 | 11 | $P_{TL}$ 12 |
| 1 | 1 | | | | | | | | | | | $\leq 209520$ |
| 2 | | | 1 | 1 | | | | | | | | $\leq 140000$ |
| 3 | | | 1 | | | | | | | | | $\leq 50180$ |
| 4 | | | | | | | | | | | 1 | $\leq 69354$ |
| 5 | | | | | 1 | | | | | | | $\leq 77406$ |
| 6 | | | | | | 1 | | | | | | $\leq 135000$ |
| 7 | | | | | | | 1 | | | | | $\leq 130000$ |
| 8 | | | | | | | | | 1 | | | $\leq 9500$ |
| 9 | 1 | −1 | −1 | −1 | | | | | | | | =0 |
| 10 | | | | | 1 | −1 | −1 | | | | | =0 |
| 11 | 1 | −.75 | −.5 | | −8 | | | | | | | =12000 |
| 12 | | | | | | 1 | −5 | | −8.57 | | | =12400 |
| 13 | 1 | | | | | | | | | 1.124 | −1 | =169820 |
| 14 | | | 1 | | | | 1 | | | | 1 | =126850 |
| 15 | | | | | 1 | | | | 1 | | | 1 =18519 |
| 16 | | | | | | | | 1 | | | | $\geq 3000$ |
| 17 | | | | | | | | 1 | | | | $\geq 10000$ |
| 18 | | | | | | | 1 | | | | | $\geq 0$ |
| 19 | | | | | 1 | | | | | | | $\geq 7740$ |
| 20 | | | 1 | | | | | | | | | $\geq 12000$ |
| 21 | 1 | | 1 | | | | | | | | 1 | $\geq 50179$ |
| 22 | | | | | | | | | | | 1 | $\geq 2000$ |
| 23 | 1 | | | | | | | | | | | $\geq 147340$ |
| COST | | | | | .006727 | | | .006727 | .006727 | | .0435 | |

CASE 3
TG #5 ON MANUAL, TG #6 ON AUTO

TABLE #4

| | TG #5 | | | | | TG #6 | | | | VV1 850/220 | VV2 220/38 | TIE LINE |
|---|---|---|---|---|---|---|---|---|---|---|---|---|
| | $T_1$ 1 | $H_1$ 2 | $L_1$ 3 | $C_1$ 4 | $P_1$ 5 | $T_2$ 6 | $L_2$ 7 | $C_2$ 8 | $P_2$ 9 | 10 | 11 | $P_{TL}$ 12 |
| 1 | 1 | | | | | | | | | | | $\leq 240000$ |
| 2 | | | 1 | 1 | | | | | | | | $\leq 140000$ |
| 3 | | | 1 | | | | | | | | | $\leq 150000$ |
| 4 | | | | | | | | | | | 1 | $\leq 6000$ |
| 5 | | | | | 1 | | | | | | | $\leq 9500$ |
| 6 | | | | | | 1 | | | | | | $\leq 10$ |
| 7 | | | | | | | 1 | | | | | $\leq 130000$ |
| 8 | | | | | | | | | 1 | | | $\leq 1.0$ |
| 9 | 1 | −1 | −1 | −1 | | | | | | | | =0 |
| 10 | | | | | 1 | −1 | −1 | | | | | =0 |
| 11 | 1 | −.75 | −.5 | | −8 | | | | | | | =12000 |
| 12 | | | | | | 1 | −5 | | −8.57 | | | =0.0 |
| 13 | 1 | | | | | | | | | 1.124 | −1 | =128060 |
| 14 | | | 1 | | | | 1 | | | | 1 | =30000 |
| 15 | | | | | 1 | | | | 1 | | | 1 =9616 |
| 16 | | | | | | | | 1 | | | | $\geq 0.0$ |
| 17 | | | | | | | | 1 | | | | $\geq 0.0$ |
| 18 | | | | | | | 1 | | | | | $\geq 0.0$ |
| 19 | | | | | 1 | | | | | | | $\geq 2000$ |
| 20 | | | 1 | | | | | | | | | $\geq 10000$ |
| 21 | 1 | | 1 | | | | | | | | 1 | $\geq 0$ |
| 22 | | | | | | | | | | | 1 | $\geq 2000$ |
| 23 | 1 | | | | | | | | | | | $\geq 0$ |
| COST | | | | | .006727 | | | .006727 | .006727 | | .0435 | |

CASE 4
TG #6 SHUT DOWN

TABLE #5

| | | Case 1 | | Case 1 | | Case 3 | | Case 4 | |
|---|---|---|---|---|---|---|---|---|---|
| | | Orig | Opt | Orig | Opt | Orig | Opt | Orig | Opt |
| Throttle | 1 | 209.52 | 240.0 | 209.52 | 240.0 | 209.52 | 209.52 | 152.06 | 168.1 |
| 220# | 2 | 147.34 | 169.8 | 147.34 | 169.8 | 147.34 | 147.34 | 118.06 | 128.1 |
| 38# | 3 | 50.18 | 59.45 | 50.18 | 60.18 | 50.18 | 50.18 | 20 | 30 |
| Cond | 4 | 12.0 | 10.75 | 12.0 | 10 | 12.0 | 12.0 | 14 | 10 |
| Power | 5 | 7740.6 | 8865 | 7740.6 | 8818 | 7740.6 | 7740.6 | 5189.4 | 5627 |
| Throttle | 6 | 78.67 | 77.42 | 78.67 | 78.67 | 78.67 | 86.67 | — | — |
| 38# | 7 | 66.67 | 67.42 | 66.67 | 66.67 | 66.67 | 76.67 | — | — |
| Cond | 8 | 12.0 | 10.0 | 12.0 | 12.0 | 12.0 | 10.0 | — | — |
| Power | 9 | 3843 | 3654 | 3843 | 3843 | 3843 | 4193 | — | — |
| 850/220 | 10 | 28.9 | — | 28.9 | — | 28.9 | 20.0 | 17.8 | — |

TABLE #5-continued

|  |  | Case 1 | | Case 1 | | Case 3 | | Case 4 | |
| --- | --- | --- | --- | --- | --- | --- | --- | --- | --- |
|  |  | Orig | Opt | Orig | Opt | Orig | Opt | Orig | Opt |
| 220/38 | 11 | 10 | — | 10 | — | 10 | — | 10 | — |
| Tie Line | 12 | 6935.4 | 6000 | 6935.4 | 5838 | 6935.4 | 6585 | 4426.6 | 3989 |
| TOTAL BLR |  | 317.09 | 317.42 | 317.09 | 318.67 | 317.09 | 316.19 | 169.86 | 168.1 |
| 220# |  | 169.82 | 169.8 | 169.82 | 169.8 | 169.82 | 169.82 | 128.06 | 128.1 |
| 38# |  | 126.85 | 126.85 | 126.85 | 126.85 | 126.85 | 126.85 | 30.0 | 30 |
| Power |  | 18519 | 18519 | 18519 | 18519 | 18519 | 18519 | 9616 | 9616 |
| Cond |  | 24.0 | 20.75 | 24.0 | 22.0 | 24.0 | 22.0 |  |  |
| TOTAL COST |  | 2434.75 | 2396.31 | 2434.75 | 2398.50 | 2434.75 | 2413.47 | 1335.20 | 1304.06 |
| $/# |  |  | 38.44 |  | 36.25 |  | 21.28 |  | 31.14 |
| SAVINGS |  |  |  |  |  |  |  |  |  |
| $/# |  |  |  |  |  |  |  |  |  |

I claim:

1. In a steam and power cogeneration system including a network of fluid flow for passing a demand of steam therethrough at respective higher and lower pressures, embodying at least two steam-to-power converter units operatively connected between corresponding ones of said flow lines at different pressures, and at least two pressure reducing valves operatively connected between corresponding ones of said flow lines at different pressures; the combination of:

means for optimizing power generation by said steam-to-power converter units and for optimizing steam flow through said network in accordance with a predetermined concurrent steam and power demand;

said optimizing means being operable in relation to a plurality of predetermined planes of control each defined by a given status and configuration of said network;

means being provided responsive to a change of actual network status and configuration for selecting optimization by said optimizing means by reference to a new plane of control associated with the new and actual status and configuration of said network;

means for controlling the distribution of steam through said network and concurrent generation of power in accordance with the optimizing results for said new plane of control.

2. The system of claim 1, with said optimizing means being operated recurrently to meet variations in said steam and power demands, thereby to provide current optimizing results; and said optimizing means being operated off-line and successively by reference to each plane of control of said plurality, the respective optimization results being stored in relation to each plane for later use;

with said optimization selecting means being operative in response to a change of actual network state and configuration to activate said controlling means in accordance with such stored optimization results and selected plane of control.

3. The system of claim 2, with said controlling means including a pair of valve position adjusting means for each of said pressure reducing valves associated with the respective sides thereof, one on the higher pressure side, the other on the lower pressure side thereof, said valve position adjusting means being concurrently controlled in response to said optimization selecting means in relation to said stored optimization results and selected plane of control, thereby to establish an initial pressure reducing valve position on each corresponding said pressure reducing valve.

4. The system of claim 3, with means responsive to pressure conditions on either side of such pressure reducing valve for controlling the position thereof about said initial position, thereby to establish a steady state of flow.

5. The system of claim 4 with the optimization results being obtained by the EVOP method.

6. The system of claim 4 with the optimization results being obtained by the linear programming method.

7. A steam and power cogeneration system including a network of fluid flow lines for passing a demand of steam therethrough at respective higher and lower pressures, embodying at least two steam-to-power converter units operatively connected between corresponding ones of said flow lines at different pressures, and at least two pressure reducing valves operatively connected between corresponding ones of said flow lines at different pressures; the combination of:

first means operative in relation to the power generation by said steam-to-power converter units and in relation to the steam flow through said network in accordance with a predetermined steam and power demand for deriving optimizing results in relation to a present plane of control defined by an actual network status and configuration;

second means operable in relation to a plurality of anticipated future planes of control, each defined by an anticipated status and configuration of said network, for deriving and for storing anticipated results corresponding to the respective anticipated planes;

third means being provided responsive to an occurring change of actual network status and configuration defining a new present plane of control for said network, for deriving from said stored anticipated results corresponding to said new plane of control and for controlling said network to adjust the distribution of steam therethrough in accordance with said derived corresponding results;

said first means being operative to derive present optimizing results in relation to said new present plane of control after the distribution of steam by said third means has been established; and fourth means operative to control the distribution of steam according to said present optimizing results from said first means, thereby to establish optimal distribution.

* * * * *